United States Patent
Lin et al.

(10) Patent No.: US 9,613,048 B2
(45) Date of Patent: Apr. 4, 2017

(54) SENDING INTERIM NOTIFICATIONS TO A CLIENT OF A DISTRIBUTED FILESYSTEM

(71) Applicant: Panzura, Inc., Campbell, CA (US)

(72) Inventors: Yun Lin, Bellevue, WA (US); John Richard Taylor, Tiburon, CA (US)

(73) Assignee: PANZURA, INC., Campbell, CA (US)

( * ) Notice: Subject to any disclaimer, the term of this patent is extended or adjusted under 35 U.S.C. 154(b) by 173 days.

(21) Appl. No.: 14/482,934

(22) Filed: Sep. 10, 2014

(65) Prior Publication Data
US 2016/0072886 A1    Mar. 10, 2016

(51) Int. Cl.
*G06F 17/30*    (2006.01)
*H04L 29/08*    (2006.01)
*H04L 29/06*    (2006.01)

(52) U.S. Cl.
CPC .. *G06F 17/30194* (2013.01); *G06F 17/30132* (2013.01); *H04L 67/1063* (2013.01); *H04L 67/1097* (2013.01); *H04L 67/2842* (2013.01); *H04L 67/42* (2013.01)

(58) Field of Classification Search
CPC ................................................ G06F 17/30194
See application file for complete search history.

(56) References Cited

U.S. PATENT DOCUMENTS

| | | | | |
|---|---|---|---|---|
| 6,094,709 A * | 7/2000 | Baylor | ................ | G06F 12/0808 711/118 |
| 6,466,978 B1 * | 10/2002 | Mukherjee | ............. | G06F 3/061 348/E5.008 |
| 6,697,846 B1 * | 2/2004 | Soltis | ................ | G06F 17/30194 707/999.001 |
| 7,487,191 B2 * | 2/2009 | Castro | ................ | G06F 17/30575 |
| 7,610,285 B1 * | 10/2009 | Zoellner | ........... | G06F 17/30115 |
| 7,844,582 B1 * | 11/2010 | Arbilla | ........... | G06F 17/3012 707/694 |
| 7,865,873 B1 * | 1/2011 | Zoellner | ........... | G06F 17/30551 715/760 |
| 8,108,338 B2 * | 1/2012 | Castro | ............... | G06F 17/30575 707/610 |
| 8,296,398 B2 * | 10/2012 | Lacapra | ............ | G06F 17/30206 209/203 |
| 8,671,248 B2 * | 3/2014 | Shen | ................... | G06F 12/0842 711/118 |
| 9,201,897 B1 * | 12/2015 | Zeliger | ................ | G06F 17/3023 |
| 2001/0033300 A1 * | 10/2001 | Dow | .................... | H01H 85/042 715/763 |
| 2005/0108298 A1 * | 5/2005 | Iyengar | ............ | G06F 17/30215 |

(Continued)

*Primary Examiner* — Jimmy H Tran
(74) *Attorney, Agent, or Firm* — Park, Vaughan, Fleming & Dowler LLP; Mark Spiller

(57) ABSTRACT

The disclosed embodiments disclose techniques for sending interim notifications to a client of a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a client request to access a file. The cloud controller determines that it will need to contact at least one of another peer cloud controller or a cloud storage system to service the request, and sends an interim notification to the client to notify the client that the request is pending.

10 Claims, 16 Drawing Sheets

(56) References Cited

U.S. PATENT DOCUMENTS

| | | | | |
|---|---|---|---|---|
| 2005/0177624 A1* | 8/2005 | Oswald | .................. | H04L 67/104 709/219 |
| 2010/0100698 A1* | 4/2010 | Yang | .................. | G06F 11/1451 711/162 |
| 2010/0325377 A1* | 12/2010 | Lango | ............... | G06F 17/30067 711/162 |
| 2010/0333116 A1* | 12/2010 | Prahlad | ............... | G06F 17/3002 719/328 |
| 2011/0066668 A1* | 3/2011 | Guarraci | ........... | G06F 17/30233 707/831 |
| 2011/0276713 A1* | 11/2011 | Brand | ................. | H04L 67/1097 709/232 |
| 2012/0011176 A1* | 1/2012 | Aizman | ............. | G06F 17/30203 707/822 |
| 2012/0089781 A1* | 4/2012 | Ranade | ............. | G06F 17/30203 711/118 |
| 2013/0036089 A1* | 2/2013 | Lucas | ............... | G06F 17/30283 707/615 |
| 2013/0074065 A1* | 3/2013 | McNeeney | ........... | G06F 11/141 718/1 |
| 2013/0117240 A1* | 5/2013 | Taylor | ............... | G06F 17/30132 707/690 |
| 2014/0129698 A1* | 5/2014 | Seago | ..................... | G06F 9/542 709/224 |
| 2014/0280800 A1* | 9/2014 | Verchere | ............. | H04L 41/0813 709/221 |
| 2015/0350159 A1* | 12/2015 | Verma | ................. | H04L 43/0888 370/329 |

* cited by examiner

SENDING INTERIM NOTIFICATIONS TO A CLIENT OF A DISTRIBUTED FILESYSTEM

BACKGROUND

Field of the Invention

This disclosure generally relates to techniques for providing flexible and extensible network storage systems. More specifically, this disclosure relates to techniques for storing and collaboratively accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques for sending interim notifications to clients of a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a client request to access a file. The cloud controller determines that it will need to contact at least one of another peer cloud controller or a cloud storage system to service the request, and sends an interim notification to the client to notify the client that the request is pending.

In some embodiments, the client is configured to abort requests that exceed a timeout interval, and sending an interim notification to the client before the timeout interval expires ensures that the client does not abort the request.

In some embodiments, the cloud controller determines the level of consistency that is associated with the requested file and/or the type of file access that is being requested by the client for the requested file, and then uses this information to determine whether a request will involve remote operations at a remote cloud controller and/or cloud storage system.

In some embodiments, the cloud controller determines that the client request needs to access the most recently updated version of the file, and contacts a remote cloud controller to synchronize recent updates for the file.

In some embodiments, the request comprises a write operation, and the remote cloud controller is the owning cloud controller for the file. In such scenarios, the cloud controller contacts the remote cloud controller to claim ownership for the file, thereby facilitating client write access for the file.

In some embodiments, the cloud controller tracks a set of delays that are associated with accessing the remote cloud controller. The cloud controller determines from the tracked information that the remote request is likely to exceed a client timeout interval, and ensures that the client receives the interim notification before the timeout interval is exceeded.

In some embodiments, the cloud controller calculates an initial interval for an interim notification that gives the remote request as much additional time as possible but also ensures that the client timeout interval is not exceeded. The cloud controller then delays sending the interim notification until this initial interval has expired.

In some embodiments, the cloud controller determines that a remote request may involve substantial delay that exceeds multiple client timeout intervals, and thus send multiple interim notifications to the client to indicate to the client that the request is still pending but needs additional time.

In some embodiments, the client is configured to send asynchronous file access requests to the cloud controller. Asynchronous requests enable the client, upon receiving an interim notification, to proceed to initiate other file operations and file requests to the cloud controller instead of busy-waiting for a request, thereby improving client file access performance.

In some embodiments, cloud controllers are configured to handle client and cloud controller requests asynchronously, thereby improving file access performance for the distributed filesystem. More specifically, cloud controllers do not block on remote operations and can continue to process new incoming client requests, send interim notifications to clients, and initiate additional remote operations while waiting for a given remote request to complete.

DETAILED DESCRIPTION

Figure 1A:
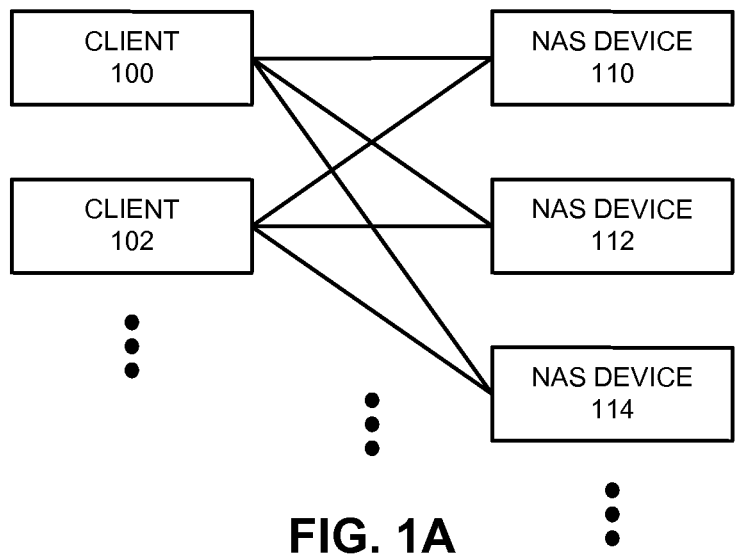
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
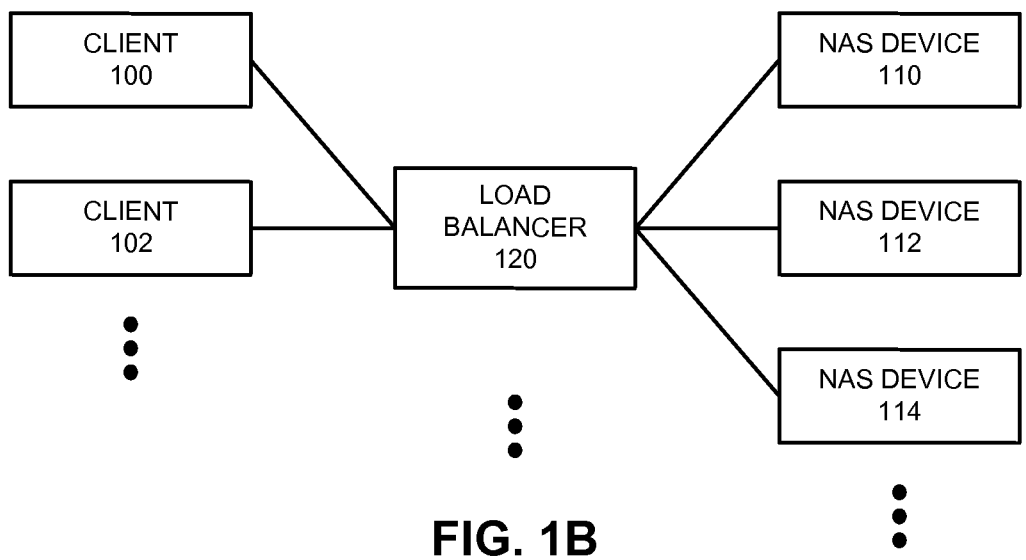
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
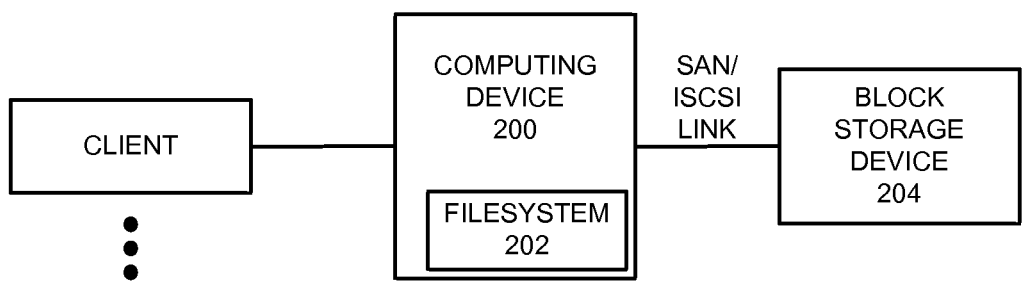
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that enables data to be accessed at different levels of consistency, thereby improving performance without negatively affecting application behavior.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
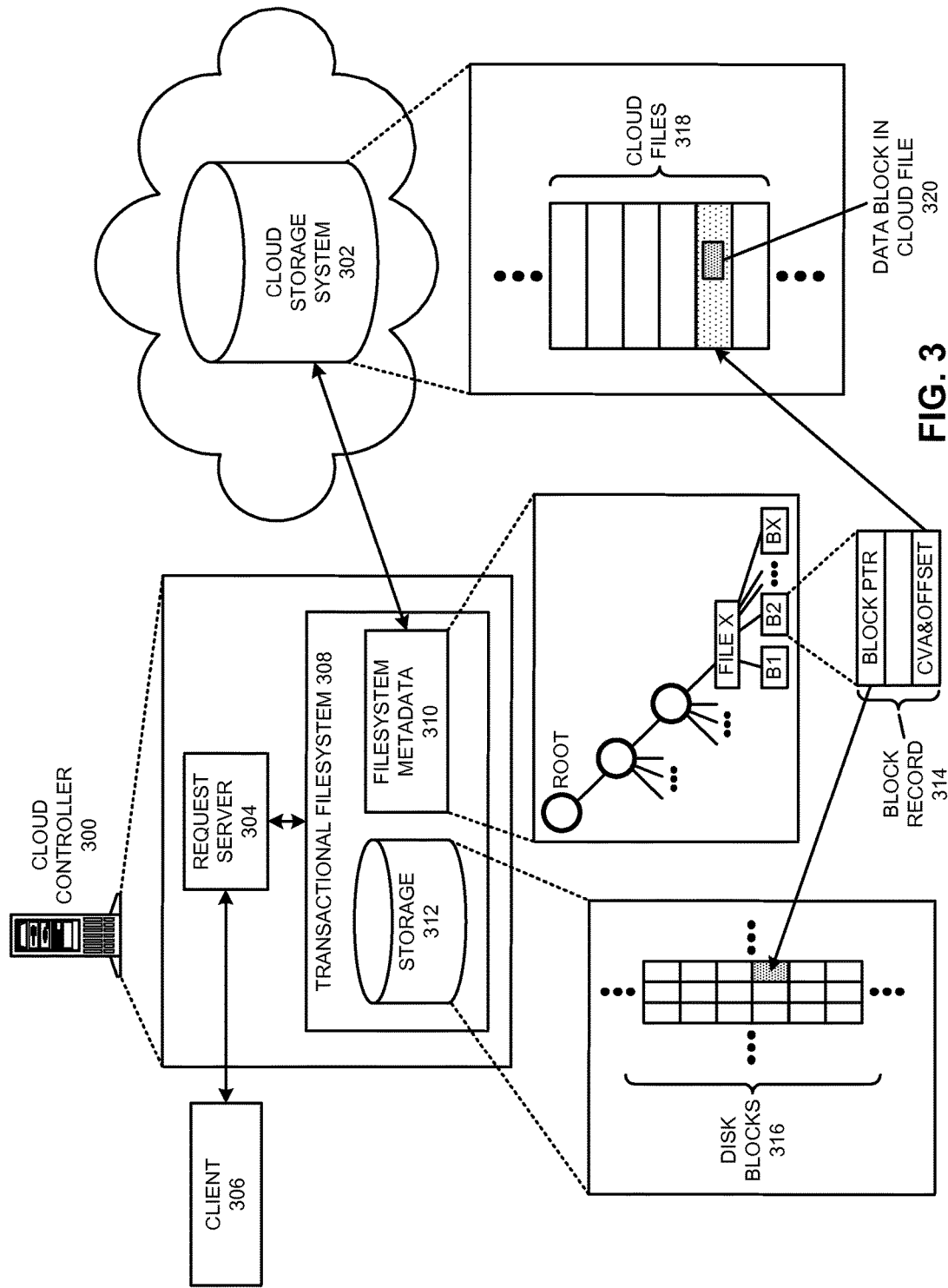
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

In some embodiments, cloud controllers may use stored snapshot data to provide access to different versions of a file. For instance, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In some embodiments, each file in the distributed filesystem is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. Additional techniques for using cloud controller to manage and access data stored in a distributed filesystem are described in more detail in pending U.S. patent application Ser. No. 13/725,767, filed 21 Dec. 2012, entitled "Accessing Cached Data from a Peer Cloud Controller in a Distributed Filesystem," by inventors John Richard Taylor, Randy Yen-pang Chou, and Andrew P. Davis, which is incorporated by reference in its entirety).

Supporting Collaboration in a Distributed Filesystem

The previous sections describe a distributed filesystem in which distributed cloud controllers collectively manage (and provide consistent access to) file data that is stored in a remote cloud storage system. As described, each cloud controller maintains (and updates) a copy of the metadata for the files stored in the distributed filesystem, but only caches a subset of the data stored in the remote cloud storage system that is being accessed (or likely to be accessed) by the respective cloud controller's clients. These cloud controllers use file write locks to ensure that only a single client can write a file at a given time, and then ensure that file modifications are propagated to the remote cloud storage system (e.g., via incremental data snapshots and incremental metadata snapshots).

While the above-described techniques allow metadata and data to be synchronized across a large number of distributed cloud controllers, there may be some delay in propagating snapshots. Such delays may complicate real-time collaboration in scenarios where multiple clients that are distributed across multiple cloud controllers attempt to collaboratively edit and/or access the same files and/or directories. The following sections disclose techniques for reducing delays for collaborative file accesses in a distributed filesystem.

Distributed Change Notification

A distributed filesystem environment presents a range of additional complexities beyond those of a local filesystem environment (e.g., an environment in which a single file server provides file services to several clients). For instance, an individual stand-alone fileserver (also referred to as a "network filer"—e.g., a CIFS fileserver) can support additional client performance optimizations by communicating file state changes and filesystem events back to interested clients (e.g., if one client changes a file, the fileserver can contact other connected clients to notify them of the change), thereby enabling collaborative interactions between clients. In another example, a single local fileserver that supports strong read-after-delete consistency can ensure that when one client deletes a file this change propagates to all other connected clients, thereby ensuring that the deleted file can no longer be read by any client. However, efficiently conveying changes across a distributed filesystem is much more difficult and may involve substantial network traffic and delays, especially as the number of cloud controllers grows.

Figure 6:
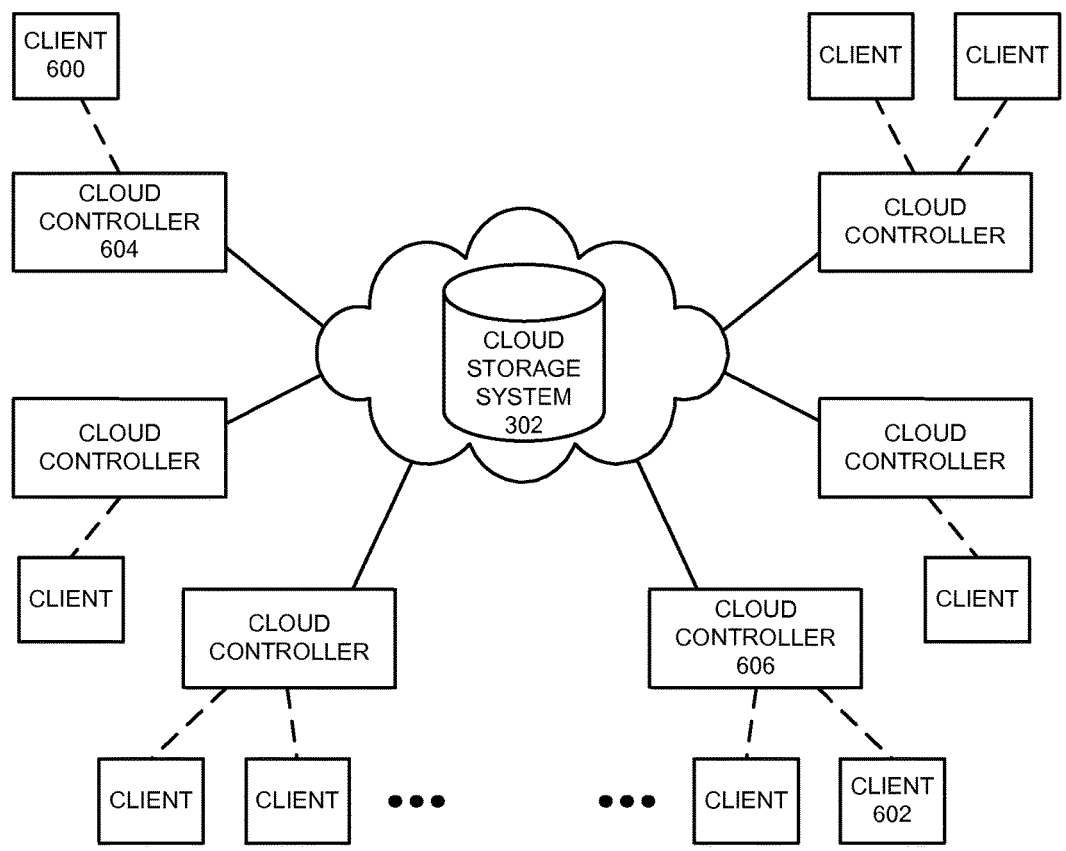
FIG. 6 illustrates a distributed filesystem in which a distributed set of cloud controllers collectively provide file services to a distributed set of clients in accordance with an embodiment.

FIG. 6 illustrates the previously-described distributed filesystem, in which a distributed set of cloud controllers collectively provide file services to a distributed set of clients. Consider a scenario in which a client 600 modifies a file ("file Y"). Client 600's request to perform a write on file Y results in client 600's associated cloud controller (cloud controller 604) acquiring a write lock for file Y from the cloud controller that "owns" file Y. After client 600 finishes writing file Y and closes the file handle, cloud controller 604 writes the changed data to cloud storage system 302 (via an incremental data snapshot) and then communicates any changed metadata to the other cloud controllers (via an incremental metadata snapshot). These cloud controllers update their metadata accordingly, thereby making the modified data available to the other clients of the distributed filesystem. Client requests for the new file data are serviced by downloading the updated data from cloud storage system 302 to each requesting client's associated cloud controller. Such update mechanisms ensure that all of the cloud controllers are updated following changes, and suffice for many non-collaborative situations in which files are being accessed infrequently and/or primarily by a single client.

Consider, however, a scenario in which a user at client 600 and a user at a second, remote client (client 602) take turns at collaboratively modifying file Y; in this scenario, only one client is actually attempting to write the file at a given time, but both clients want to see and respond to the changes made by the other user as soon as possible. Such situations call for "strong read-after-write consistency," which ensures that following a file write subsequent reads or writes will see the updated file contents instead of the previous version of the file. Note that there is no guarantee of read-after-write consistency until a client writing a file has closed the file handle or a subsequent write lock is granted to another client. Thus, a second client attempting to read a file that is still being written can receive stale content. However, once the client application writing a file closes the file, all of the modified data should be flushed to the cloud controller, and another client that subsequently attempts to read the file should see the updated version of the file.

Unfortunately, the time delays associated with sending, receiving, and processing incremental snapshots may prevent strong read-after-write consistency, and hence hinder collaborative work. In some embodiments cloud controllers ensure strong read-after-write consistency (or, more specifically, read-after-close consistency) for files in the distributed filesystem by directly notifying the other cloud controllers in the system when the file handle for each modified file is closed. However, the number of cloud controllers in the distributed filesystem may scale to a large number, and thus sending notifications for all file changes to all of the cloud controllers in the distributed filesystem may involve a substantial number of network messages (and hence substantial network bandwidth and processing overhead). Hence, in some embodiments the set of notifications is reduced by ensuring that notifications only need to be sent to a targeted set of cloud controllers.

In some embodiments, cloud controllers may be configured to send two types of notification messages:

1. Registration notifications, which are used to indicate that a cloud controller is registering to request notification whenever a specified file, directory, and/or portion of the filesystem hierarchy is modified; and
2. Change notifications, which are sent whenever a cloud controller receives from a client a file close request (following a write) that is in the scope of a registered filesystem entity (e.g., a client file close request that follows a write to a file, directory, and/or portion of the filesystem that has been identified in a previous registration notification from another cloud controller).

These two types of messages can be used to reduce the overhead associated with ensuring strong read-after-write consistency. For instance, cloud controllers may be configured to send registration notifications to all of the cloud controllers in the system, after which each cloud controller then only needs to send change notifications for any given file modification to the set of cloud controllers than have registered to receive notifications for that file (and/or portion of the filesystem containing the file).

The manner in which registration and change notifications are used can facilitate reducing the number of notification messages that are sent between the cloud controllers of the distributed filesystem. For instance, in some embodiments tunable parameters for notifications can include: 1) the set of filesystem entities that are being tracked using these mechanisms; 2) the granularity of the tracked filesystem entities that are being registered; and/or 3) one or more time intervals that are associated with registration.

In some embodiments, cloud controllers can be configured to only send registration and change notifications for a subset of the files in the distributed filesystem. For instance, a configuration file (and/or locality policy) may be configured to identify file types and/or file locations (in the filesystem hierarchy) that will need strong read-after-write consistency. For example, these configuration settings may indicate specific file extensions that are likely to involve collaboration and/or file extensions that do not require such consistency (e.g., image and video files). Upon receiving a request from a client to open a file identified to need registration, the cloud controller receiving the request broadcasts a registration notification to all of the other cloud controllers in the system; any other cloud controller receiving a write request from a client for the same file will then send the first cloud controller a change notification.

Note that in some embodiments, cloud controllers may also be configured to dynamically identify files, directories, and sub-hierarchies that would benefit from registration and change notifications. For instance, cloud controllers may detect (e.g., from successive incremental metadata snapshots and/or other tracked access patterns) that multiple clients are attempting to collaboratively edit a set of files, and enable registration and change notification tracking for those files. Cloud controllers may also be configured to use a range of heuristic-based techniques to identify files that would benefit from registration and change notifications. For example, cloud controllers may be configured to scan the contents of files (e.g., instead of only looking at file extensions) and/or use other file characteristics to determine a file's type and expected access behavior. Note that when determining whether to provide collaborative support, false positives are generally preferred over false negatives. Sending registration notifications for a small set of files that do not really need such support primarily involves some additional network message and notification tracking overhead (e.g., note that if no other cloud controllers register interest in the same file, no change notifications need to be sent). In contrast, not providing such support for a file that is being collaboratively accessed can cause substantial client delays, user frustration, and/or potential file inconsistency.

In some embodiments, different granularities of tracked filesystem entities may be used to adjust the amount of notification traffic for the distributed filesystem. For instance, registration notifications may be specified at the granularity of an individual file, a directory (which may contain any number of files), or a sub-hierarchy of the filesystem hierarchy that includes multiple directories. For example, in environments where sets of users commonly collaborate upon specific project directories, a cloud controller may detect that a given client has begun requesting files from a known project directory and thus send a single registration notification for the entire project directory (e.g., based on the premise that the client is quite likely to be interested in all of the files in that directory anyway and that sending a single registration notification for the entire directory has much lower overhead than sending registration notifications for each file in the directory). After sending this registration notification for the directory, the cloud controller then receives change notifications for any files modified in the directory. In another example, some organizations may group files that are likely to be collaboratively edited in a specific portion of the filesystem hierarchy, in which case cloud controllers may be configured to only send a single notification for that entire portion of the hierarchy and then send subsequent change notifications every time any file in that portion of hierarchy is modified. Note that some system implementations may allow the range to granularities to be selected on a per-message basis in each registration notification message, while others may specify a single granularity for the system (e.g., each notification message specifies a directory).

In some embodiments, a range of time intervals may be used to adjust the amount of notification traffic for the distributed filesystem. For instance, clients may only be interested in files for a limited time, and hence registration requests may be configured to expire after a specified time interval. In some implementations the expiration time may be specified on a per-registration-notification basis (e.g., depending on the files being accessed and/or a locality policy), while in other implementations all registration requests may expire after a fixed time interval (e.g., ten minutes after receipt). If a client continues to access a given file and/or directory beyond this time interval, its associated cloud controller can send an additional registration notification to extend the time interval in which it will receive change notifications. Alternatively, if the client is no longer accessing the file, the set of cloud controller note that the registration time interval has expired and purge that specific registration. Additional ("renewal") registration messages are also broadcast to all of the cloud controllers, so an alternate technique may instead involve extending registration time intervals, thereby reducing the number of renewal notification messages.

Note that sending additional registration notifications near or after the expiration of a registration time interval can lead to race conditions that can result in cloud controllers missing change notifications. For instance, in some situations a network delay might cause a subsequent renewal registration notification for the same file to not be received before the expiration of the previous registration for that file. As a result, the cloud controller sending the renewal registration notification might not receive a change notification if that file was changed (via another cloud controller) during that intermediate interval. In some embodiments, such race conditions can be avoided by erring on the side of over-notification and broadcasting registration renewals on a shorter time interval than the registration duration interval (e.g., one minute before the registration duration interval would expire). This "pre-expiration renewal time interval" may be fixed or adjusted based on expected system delays; for instance, cloud controllers may track message delays between individual cloud controllers over time, and then use this information to adjust such time intervals accordingly.

An alternative technique might involve not having registration notifications time out, and instead sending de-registration messages. However, de-registration messages would need to be broadcast to all cloud controllers, and hence may be unreliable and result in a higher message cost on a system-wide basis.

The above-described techniques assume that at any given time the number of clients (and cloud controllers) that are accessing a given directory is likely to be much fewer than the total number of clients and cloud controllers (even if the distributed filesystem includes a large number of cloud controllers). In such environments, multicasting change notifications to a limited subset of cloud controllers (instead of broadcasting to all of the cloud controllers) provides strong read-after-write consistency while reducing the amount of associated message traffic. As described above, reducing the number of files that are tracked and selecting an appropriate registration granularity and time interval can further reduce message traffic and system overheads. For instance, time intervals can be selected such that the frequency of change notifications is much higher than the frequency of registration notifications, thereby reducing the number of broadcast messages that need to be sent to all of the cloud controllers.

Note that change-notification techniques are independent of and separate from incremental metadata and data updates. The described change-notify techniques are real-time notifications that are sent to ensure that any interested cloud controller node can receive modifications to a registered file immediately instead of (with some delay) via the normal incremental metadata updates. More specifically, a change notification message can be used to identify the cloud controller that is caching the most recent version of the registered file. For instance, a cloud controller may cache change notify information until it receives a normal incremental metadata snapshot that describes the same change (at which point the metadata for the file is updated to reflect the recent changes and the current owner, and the cached change notification can be discarded). During the intermediate time interval, however, if a client requests access to this (registered) file, the cloud controller can use the information from the change notification to directly contact that hosting cloud controller and immediately synchronize the modified file data (instead of waiting for the incremental metadata snapshot that describes the change to arrive), thereby bypassing the normal update mechanisms and presenting the updated file contents to the client as quickly as possible; such retrievals are described in more detail in a subsequent section. Note that if multiple change notifications are received for the same file, a cloud controller will typically only preserve the most recent set of changes (thereby ensuring that it can contact the most recent owner to synchronize the file changes if needed).

Note also that the above-described distributed-change-notify techniques are not tied to any particular file or network filesystem protocol, but can instead be applied generally to efficiently communicate file state in any distributed filesystem, thereby allowing clients to be updated when files change in different geographic locations.

Figure 7:
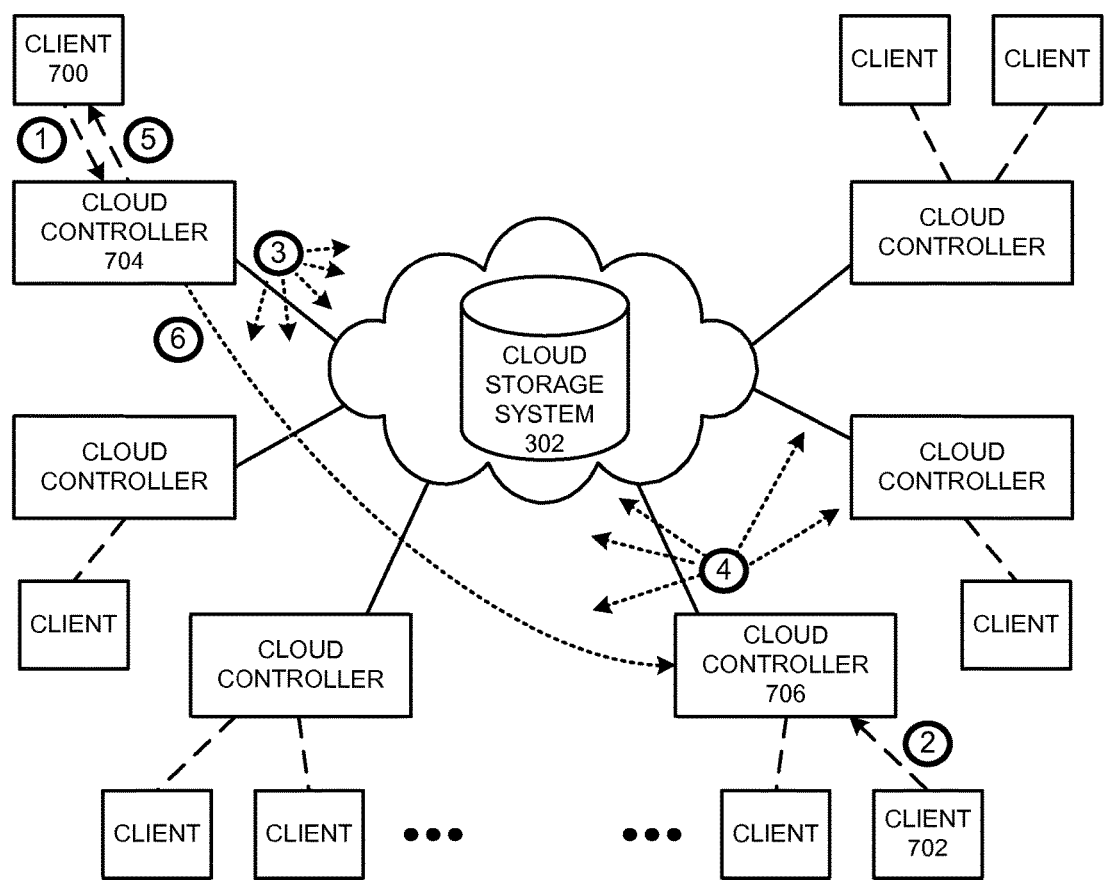
FIG. 7 illustrates a scenario in which distributed-change-notify techniques are used to support collaboration between clients in accordance with an embodiment.

FIG. 7 illustrates a scenario in which distributed-change-notify techniques are used to support collaboration between clients 700 and 702. For instance, consider a situation in which the users associated with these two clients both want to collaboratively modify a file, "file Z," in the same project directory, and that this project directory has been previously flagged as a directory that needs additional collaboration support. As each of the two clients (700 and 702) send requests to read file Z (operations 1 and 2, respectively), their respectful cloud controllers (704 and 706) detect that this directory needs the additional collaboration support, and each sends out a registration notification (operations 3 and 4, respectively, in FIG. 7) to all of the other cloud controllers in the distributed filesystem to indicate that those cloud controllers would like to receive change notifications for any changes in this directory for a specified time interval (e.g., the next ten minutes). All of the cloud controllers take note of this registration and track subsequent client file writes to determine if corresponding change notifications need to be sent.

Subsequently, client 700 sends cloud controller 704 a request to open file Z for writing. Cloud controller 704 requests and receives a write lock for file Z (e.g., by negotiating with the cloud controller that "owns" file Z), and grants the write permission to client 700. While client 700 is writing new data to file Z (but has not yet closed the file), other clients reading the file will still access the previous version of the file. When client 700 completes writing changes to file Z to cloud controller 704 and closes the file handle (operation 5), cloud controller 704 checks and determines that file Z (and/or its parent directory) has active registrations, and sends out change notification messages to every cloud controller with an active (un-expired) registration that encompasses file Z (including, in this case, cloud controller 706, as indicated by operation 6). Cloud controller 706 receives the change notification, and can then immediately retrieve the latest metadata and data for file Z from cloud controller 704 for subsequent accesses by client 702, thereby providing strong read-after-write consistency for file Z. Cloud controller 704 also subsequently sends an incremental data snapshot that includes the file changes to cloud storage system 302 (not shown) and then sends an incremental metadata snapshot to the other cloud controllers to notify them of the updated file; thus, other cloud controllers that had not sent registration notifications for file Z (and/or file Z's parent directory) will also eventually be notified of the changes for file Z via the incremental metadata snapshots and can then access the updated file data via cloud storage system 302.

Note that in some embodiments, the operations performed by each cloud controller to support distributed-change-notify capabilities may include: 1) receiving and processing registration notifications to maintain a table of tracked files/directories and their expiration times; 2) tracking the time of its own previously-sent registration notifications and client activity to determine if and/or when renewal registration notifications need to be sent; 3) determining whether a write request received from a client is covered by any of the tracked, unexpired registration notifications and needs a change notification to be sent; and 4) receiving and processing change notifications from other cloud controllers.

In some embodiments, cloud controllers may also be configured to send change notification messages for namespace operations (e.g., when a file is created, deleted, or renamed) in addition to data operations (such as file writes). Strong namespace consistency can improve the performance of applications that collaborate across controllers. For instance, a cloud controller that sends a registration notification for a directory would now also be notified of any namespace changes in that directory, and thus would be able to provide additional capabilities and/or guarantees for the distributed filesystem (e.g., strong read-after-delete consistency). Without change notifications for namespace operations, applications would otherwise need to wait for such file namespace updates to arrive via the normal incremental metadata snapshots, which might significantly delay any application actions that are triggered by such namespace events.

Figure 8:
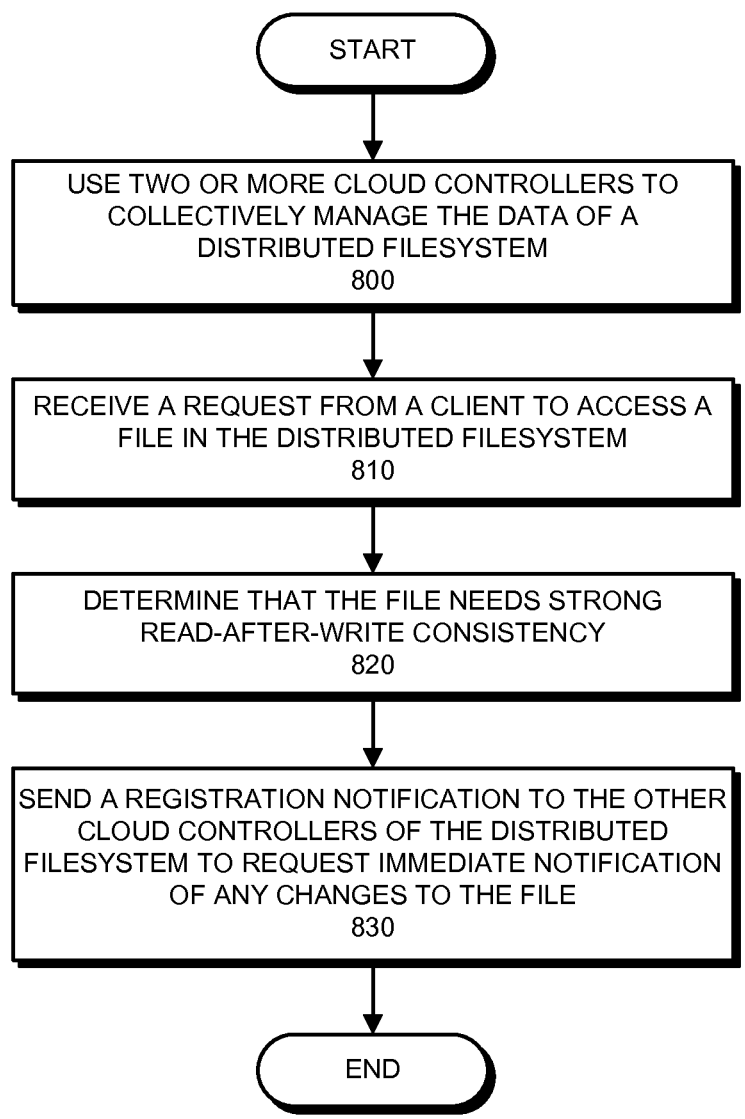
FIG. 8 presents a flow chart that illustrates the process of registering to receive distributed change notifications for a distributed filesystem in accordance with an embodiment.

FIG. 8 presents a flow chart that illustrates the process of registering to receive distributed change notifications for a distributed filesystem. Two or more cloud controllers collectively manage the distributed filesystem data that is stored in one or more cloud storage systems (operation 800); the cloud controllers cache and ensure data consistency for the stored data. During operation, a cloud controller receives a request from a client to access a file in the distributed filesystem (operation 810). The cloud controller determines that the file needs strong read-after write consistency (operation 820) and sends a registration notification to the other cloud controllers of the distributed filesystem to request immediate notification of any changes to the file (operation 830). The other cloud controllers track received registration notification requests, and another cloud controller receiving a subsequent client file write and close request for the same file will, based on the previous registration request, send a change notification to the first cloud controller.

In summary, cloud controllers can leverage change notification techniques to improve distributed collaboration for files in the distributed filesystem. Files changes that do not need strong consistency can be propagated "lazily" via incremental metadata snapshots, while files that need stronger consistency are registered and are supported by immediate change notifications. This arrangement allows controllers to prioritize precious inter-cloud-controller bandwidth for time-critical updates. The set of high-priority files that are subject to distributed change notification and synchronization can be configured and/or tuned based on client needs and on the amount of cloud controller and network bandwidth available.

Managing Client Caching in a Distributed Filesystem

In some embodiments, cloud controllers are extended to facilitate client caching. More specifically, cloud controllers can be extended to support "distributed oplock" capabilities that allow cloud controllers to grant opportunistic lock requests and also allow remote cloud controllers to initiate the revocation of opportunistic client locks. Distributed oplocks allow each cloud controller to provide locking capabilities that facilitate client caching (e.g., lock files and perform buffered writes) for files stored in the distributed filesystem while also providing the capability to revoke client locks as needed when distributed clients attempt to collaboratively edit files. The distributed cloud controllers work together to collectively grant locks as requested (where possible), revoke locks as needed, and propagate file changes to their clients, thereby transparently providing the abstraction of a single local fileserver to clients while maintaining strong read-after-write consistency (when needed) for a distributed filesystem. Techniques for extending cloud controllers to support client caching are described in more detail in pending U.S. patent application Ser. No. 14/298,496, filed 6 Jun. 2014, entitled "Managing Opportunistic Locks in a Distributed Filesystem," by inventors Yun Lin and John Richard Taylor, which is incorporated by reference in its entirety).

Synchronization Updates Between Cloud Controllers

In some embodiments, the cloud controllers of a distributed filesystem may be configured to selectively close the synchronization gap of bulk update techniques (such as incremental metadata snapshots) when needed by enabling additional direct transfers of data between two cloud controllers. Such techniques can be used to craft "metadata deltas" that support fast, granular interaction between two (or more) clients that are working on the same set of files via different cloud controllers. Such techniques can involve directly synchronizing changes between cloud controllers to propagate file modifications to collaborators more quickly and proactively pre-synchronizing related files, and are described in more detail in pending U.S. patent application Ser. No. 14/313,703, filed 24 Jun. 2014, entitled "Synchronizing File Updates Between Two Cloud Controllers of a Distributed Filesystem," by inventors Brian Christopher Parkison, Andrew P. Davis, and John Richard Taylor, which is incorporated by reference in its entirety).

Byte-Range Locks

The techniques disclosed in the previous sections describe managing file ownership and access at a per-file granularity.

For instance, a client that requests to exclusively write a file either receives an exclusive lock to the entire file (even if it only seeks to modify a single byte of the file) or fails (e.g., receives a sharing violation).

In some embodiments, cloud controllers allow clients to perform byte-range locking on files, thereby enabling fine-granularity file access and sharing. More specifically, cloud controllers can be configured to allow multiple clients to request and lock specific portions of a given file (as long as the requested byte ranges and/or requested access types do not collide). Note that the supported byte ranges and the number of simultaneous locks for files may be implementation dependent. For instance, some implementations may support small, large, and/or variable sized byte-range locks for files. Different byte-ranges of the same file may simultaneously be owned and accessed by different cloud controllers and clients, and a specific byte-range may also be simultaneously accessed by multiple clients as long as the access types and sharing modes for those clients are complementary. For example, a number of clients may request (and be granted) shared byte-range locks that allow shared read access to the first half of a file while another client simultaneously holds an exclusive write byte-range lock for the last third of the file. In another example, multiple clients may request exclusive byte-range locks for different parts of a file and simultaneously modify their respective (distinct) regions.

Supporting byte-range locking in a distributed filesystem may involve some additional trade-offs and complexity. For instance, different cloud controllers receiving client requests to access a portion of a file may need to determine which specific byte ranges of the file are already being locked by other cloud controllers. In some embodiments, each given file may still be owned (e.g., have access managed by) a single cloud controller, with each respective cloud controller now also managing byte-range locks for the files that it owns. Other cloud controllers send requests to an owning cloud controller to "check out" byte-range locks for a file, and the tracking information for the byte-range locks can be transferred to another cloud controller as needed if the overall ownership for the file changes. In alternative embodiments, ownership may be managed at a finer (sub-file) granularity, and the ownership of specific portions of a file may be managed (and transferred) independently. Note that some of these techniques may involve higher overhead than per-file granularities, and hence may only be selectively supported for a limited subset of the files in the distributed filesystem.

In some embodiments, some aspects of byte-range (as well as whole-file) accesses may be guided by the client application. For instance, client applications may be allowed to specify the desired response when a requested lock is not available; e.g., client applications may be given the option of having a request fail immediately if there is a sharing conflict or of being queued to wait until the requested file (or byte-range lock- of the file) is available. An application developer that is aware of such capabilities can optimize application behavior accordingly. For example, an application developer that knows that multiple client application instances are likely to simultaneously access different byte ranges in the same file may ensure that the application performs writes and then releases write locks as quickly as possible and specify that the application should wait on unavailable byte ranges; more specifically, the application developer knows that locked resources are likely to be freed again quickly, and this known write behavior reduces the potential negative consequences (and uncertainty) that are typically associated with queuing to wait on locked resources.

Another example of application awareness involves file append behavior. Clients can lock the end of the file to append new data. For instance, an application may be able to specify the EOF (end-of-file) for the file in a byte-range lock request, and then (if the lock is granted) write new data to the end of the file. If the application is known to always append regular-size blocks to the end of a file, multiple clients executing the application might be configured to request and be granted different byte ranges past the EOF, and append their respective new blocks to the file simultaneously. If, however, the application is known to append variable-sized chunks of data to the end of files, such techniques may lead to file fragmentation, and the application writer may instead customize application behavior to ensure that only one application instance can append to the file at a time (and that all other application instances that attempt to append in the same timeframe need to wait on the EOF byte-range lock). Alternatively, in some instances an application writer might ensure that the application pads the file (e.g., adds additional blank data to the end of the file) so that application instances can each lock and then write their new data to specified (different) locations in the (padded) file.

Note that in some embodiments byte-range locks may be applied to any arbitrary offset within a file. Furthermore, non-owning cloud controllers that are already holding a byte-range lock may be able to directly handle some additional byte-range lock requests that apply to the same portion of the file. Consider, for instance, a scenario in which the lessor for a file (e.g., the owner of the namespace that contains the file) manages multiple shared client write accesses to the file. In one implementation, the lessor manages all byte-range locks for the file; e.g., the lessor keeps track of all of the outstanding shared and/or exclusive byte-range locks for the file, and is queried every time any other cloud controller's client requests or releases a byte-range lock for the file. In an alternative implementation, a non-owning cloud controller (e.g., a "lessee") is authorized to manage further byte-range lock requests that fall within the scope of existing byte-range locks that are already held by the lessee. For instance, a lessee that has already received a byte-range lock for a portion of a file and receives a second byte-range lock request that is completely within the same (already locked) region may grant or deny the second byte-range lock request without contacting the lessor if there is sufficient local information available to make the decision. For example, if a shared byte-range lock has been granted to the lessee, the lessee may grant a second shared byte-range lock request for a sub-range of that locked portion before contacting the lessor, and then subsequently send a lock request to the lessor asynchronously for bookkeeping. In another example, a lessee holding an exclusive byte-range lock for a portion of the file may deny a second subsequent shared (or exclusive) byte-range lock request that applies to the same portion of the file without contacting the lessor. Managing a subset of byte-range lock requests on non-owning cloud controllers when sufficient local information is available to make the decision can reduce network and file-access latencies for the file and reduce the load on the lessor.

In some embodiments cloud controllers may also be configured to guarantee strong data consistency for clients that are concurrently accessing a file using distributed byte-range locks. For instance, a (lessee) cloud controller that is sending a byte-range lock request for a file to the file's owning cloud controller (e.g., the lessor) may include checksums for the file data blocks covered by the requested byte range. If the lessor grants the byte-range lock, the lessor compares these received checksums with a local checksum for the same byte range in its local file version; if the checksums are different, the lessor sends the updated file contents for the byte range from its local version of the file to the lessee along with the byte-range lock acknowledgement (e.g., effectively sending a synchronization update for the requested byte range). Furthermore, a lessee (cloud controller) relinquishing an exclusive byte-range lock after performing a write may be configured to send the updated file data for that byte range to the lessor (cloud controller) along with a byte-range lock release request, thereby ensuring that the lessor always has an up-to-date copy of the file as well as an accurate byte-range-lock map of the entire file. Note that change notification messages (as described in previous sections) may also be triggered after a file that is being modified using a byte-range lock is closed (e.g., if there are outstanding notification requests for the file).

Figure 11:
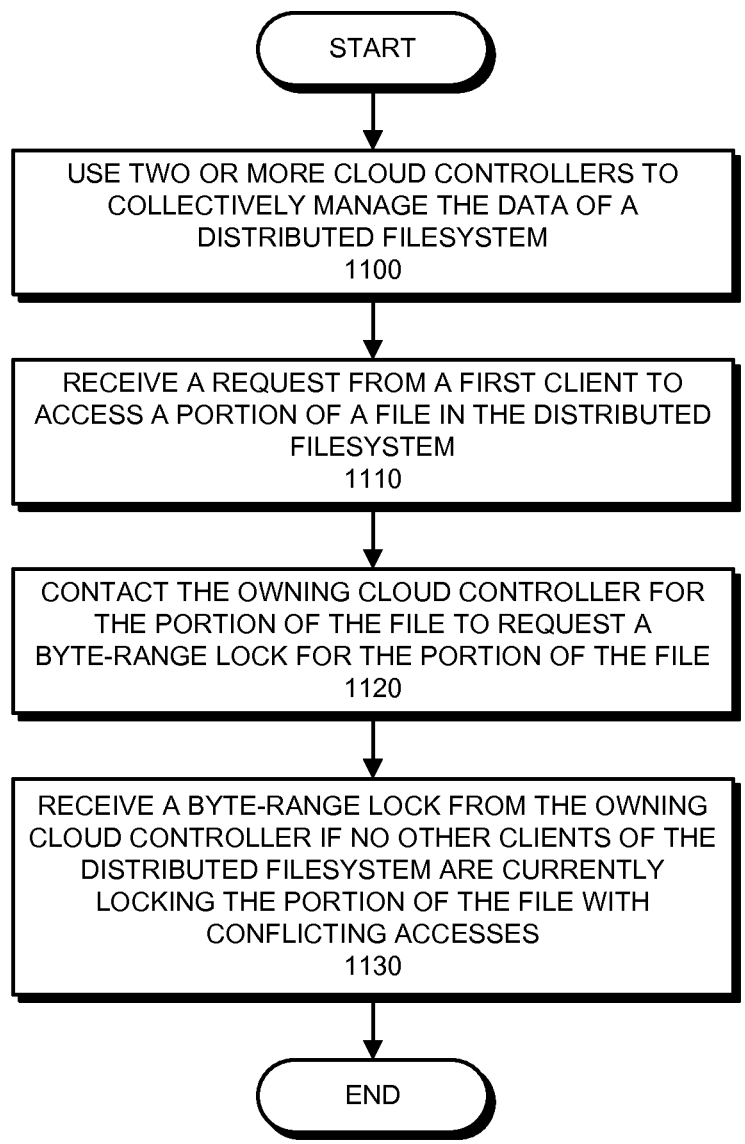
FIG. 11 presents a flow chart that illustrates the process of using byte-range locks to manage multiple concurrent accesses to a file in a distributed filesystem in accordance with an embodiment.

FIG. 11 presents a flow chart that illustrates the process of using byte-range locks to manage multiple concurrent accesses to a file in a distributed filesystem. Two or more cloud controllers collectively manage distributed filesystem data that is stored in the cloud storage systems (operation 1100); the cloud controllers ensure data consistency for the stored data, and each cloud controller caches portions of the distributed filesystem. During operation, a cloud controller receives from a first client a request to access a portion of the file (operation 1110). The cloud controller contacts the owning cloud controller for the portion of the file to request a byte-range lock for that portion of the file (operation 1120). The owning cloud controller returns a byte-range lock for the requested portion of the file to the requesting cloud controller if no other clients of the distributed filesystem are currently locking the requested portion of the file with conflicting accesses (operation 1130).

The following section illustrates an exemplary scenario in which byte-range locks are leveraged to optimize a specialized (append-only) access behavior.

Optimized Techniques for Shared Files with Append-Only Write Behavior

Previous sections disclose a range of techniques that can be leveraged to facilitate and improve the performance of collaboration between multiple distributed clients that are collaboratively modifying the same file. In some embodiments, cloud controllers may be configured to identify situations that involve an even higher level of collaboration and, upon determining that file accesses meet a specified set of criteria, optimize synchronization behavior and byte-range locks to even further improve collaboration support and performance.

Figure 9:
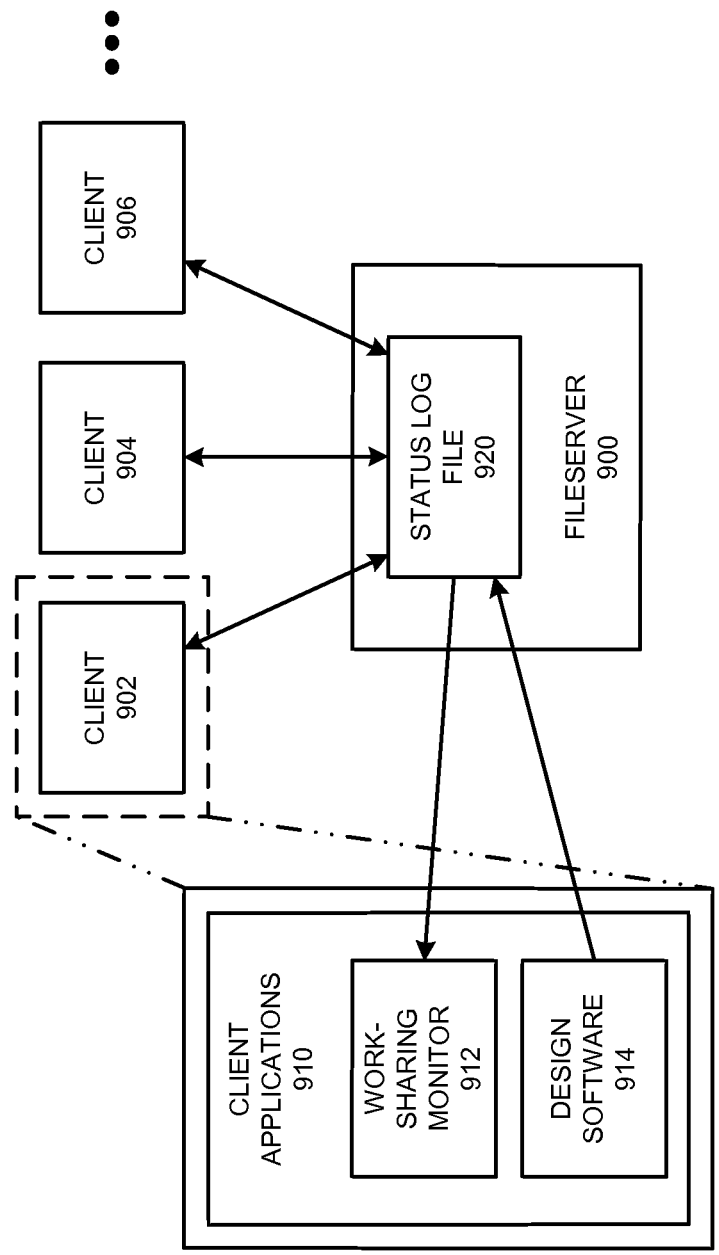
FIG. 9 illustrates an exemplary scenario in which a large number of clients collaborate on a shared project design and track status changes using a single shared status log file in accordance with an embodiment.

Consider, for instance, an exemplary scenario in which a large number of clients each execute instances of an application that collaborate on a shared project design and track status changes using a single shared status log file (as illustrated in FIG. 9 in the context of a single stand-alone fileserver 900). In FIG. 9, clients 902-906 all execute a set of related client applications 910 that access shared status log file 920. For instance, client applications 910 may comprise a set of design software components that are being used to design the model of a building to be constructed, including a design software application 914 that end-users use to directly edit the model for the building and a work-sharing monitor 912 that conveys status updates for the model to the users (e.g., by polling the status log file 920 for status changes and then displaying such changes to each user).

When a user begins executing the design software 914 and opens the project files for the model, design software 914 opens the status log file 920 for the model for writing, and logs (e.g., appends) a session entry to indicate that the user is currently editing the model. Design software 914 appends status information for the actions that are performed by each user on the model to status log file 920, and then subsequently also appends a status log entry when the user stops editing the model and closes the project files. The work-sharing monitor applications 912 for all of the clients working on the same project are configured to check the status log file 920 for that project frequently (e.g., multiple times every second) to detect such status changes, and notify the end-users in real-time of who else is actively working on the model, any operations that are being undertaken on the model, and/or such operations' status (e.g., by displaying a status bar that shows an operation's status). Such status updates allow individual users to schedule their own activities more carefully (e.g., to avoid conflicts), and the log file also provides an audit trail that can be used to isolate and debug problems. Note that while design software 914 may be configured to allow users to work on the model at the same time, each user may operate upon a local copy of project files that is cached by the client and then "check in" their changes to a master copy when they are done. In this context, design software 914 may log which portion of the model a given user is working on, and then indicate when the user "checks the changes in" (e.g., synchronizes the changes back into the master copy so that other users can also see and access the changes). Other users can see the associated status changes for these operations in the work-sharing monitor 912, and might for instance: (1) delay checking in their own changes to the model until the other person's changes have been committed; or (2) upon being informed that another person's changes have been successfully checked in, request and inspect the previous user's updates. Note that the shared status log file does not provide access control for the project and does not necessarily display the specific changes that users have made to the model (e.g., status changes will typically indicate what users are working on, but do not display the actual project file data that is being modified).

Logistically, the above scenario involves an even higher level of collaborative file management than described in the previous sections. There is typically one such special shared status log file per model/project, which means that the design software on each client that is accessing the shared project opens and appends status changes to the shared log file for its associated user for the extent of their design session, thereby requiring support for multiple potentially concurrent writes to the shared log file when multiple clients are working on the same project simultaneously. Meanwhile, the work-sharing monitor on each client constantly polls the file to detect and propagate any changed status to users as quickly as possible. In a scenario where the multiple clients all access a shared status log file that is hosted on a single fileserver, this fileserver can ensure that the connected clients access the shared log file with file buffering disabled (e.g., all writes and reads are required to pass through to the fileserver), and can then append newly received status information to the shared log file in the order in which it is received from clients. Note, however, that extending such collaboration support to a distributed filesystem is more challenging.

In some embodiments, cloud controllers leverage both the techniques described in the previous sections as well as some additional capabilities to provide a substantially similar level of collaboration support for a shared status log file that is stored in a distributed filesystem. More specifically, cloud controllers can be configured to: (1) provide distributed clients with the appearance of multiple concurrent write support for shared files (using byte-range locking) and (2) take advantage of an append-only file write access pattern to further reduce the time delay for synchronization updates, thereby ensuring that updates (and write locks) for such shared files are propagated between cloud controllers as quickly as possible.

In some embodiments, a set of cloud controllers are configured to use byte-range locking to enable shared writes to a shared status file in certain special circumstances (e.g., a shared status log file). More specifically, cloud controllers may be configured to detect such special accesses and allow all of the requesting clients to open such files for writing, and then enable clients to leverage byte-range locking to ensure that clients don't overwrite each other's write data. For instance, cloud controllers may be configured to allow shared multiple write access for clients that are trying to open a specific supported file type (e.g., a file type with an extension such as ".slog" that is known to be used for shared status log files with append-only write behavior). The cloud controllers then work together to support the abstraction of multiple concurrent writes and ensure that data written to this file does indeed remain consistent by rapidly migrating an exclusive byte-range write lock that locks beyond the end of the file throughout the system to each cloud controller that receives an actual write from a client for that file. Note that the cloud controllers simultaneously grant shared read-only byte-range locks for the rest of the shared status log file, thereby ensuring that the work-sharing monitor applications can read previously written data safely (and also ensuring that no clients can perform non-appending writes to the file).

In some embodiments, cloud controller configuration optimizations that support the abstraction of multiple concurrent writers may include (but are not limited to):

disabling opportunistic writes for the shared file: by disabling oplocks for such files, cloud controllers ensure that all writes and reads for the shared file are routed immediately to a cloud controller, thereby reducing update latencies for the shared file as much as possible.

leveraging change notification capabilities: cloud controllers can leverage the previously described distributed registration and change-notify capabilities to ensure that all involved cloud controllers can determine which cloud controller is likely to currently own the byte-range write lock for the shared file, thereby allowing write locks and file changes to be acquired as quickly as possible (e.g., to update work-sharing monitors). Cloud controllers send out appropriate registration notifications whenever one of their clients opens the project and status log files. Note, however, that change-notify behavior may need to be adjusted for special file access situations. For instance, the design software on the client may be configured to keep the status log file open for writing for a user's entire design session (e.g., not close the status log file between writes). Thus, cloud controllers may be configured to send change-notify messages after events other than file close. For example, the design software may perform writes to a status log file by issuing a CIFS file lock command, appending the new status information to the status log file, and then issuing a CIFS file unlock command; in such scenarios, cloud controllers may be configured to send change notifications whenever the status log file is written and unlocked (instead of closed).

using byte-range locking to simultaneously support shared reads and exclusive writes: cloud controllers may used byte-range locking for a shared status log file to provide work-sharing monitor applications with shared read access while simultaneously providing the design software with a byte-range lock that allows new data to be appended to the log file. In scenarios where status updates are written relatively infrequently the probability of multiple clients simultaneously writing a status log file may be fairly low, making collisions fairly unlikely. However, in some situations two cloud controllers may receive file writes from their clients at substantially the same time. Only one of the cloud controllers can successfully receive the byte-range write lock for the file from the owning cloud controller, so other cloud controllers that are trying to write status information at the same time temporarily queue to wait for the lock until it becomes available again.

In some embodiments, cloud controllers also leverage known append-only write characteristics to further optimize synchronization updates. As described previously, normal "lazy" incremental metadata snapshots and rsync-based synchronization techniques have limitations that make them less ideal for propagating changes for files that are being simultaneously accessed by multiple collaborators. The previous section discloses a set of synchronization techniques that allow cloud controllers to compare their metadata for the file and send synchronization updates that comprise primarily metadata deltas and (only the) modified file data that is not yet available via the cloud storage system. Such techniques involve less overhead and reduce the size of intra-cloud-controller data transfers, thereby substantially reducing synchronization delays. However, such techniques can be improved upon even further when the file being collaborated upon is known to only receive new data appended to the end of the file.

Consider a scenario in which a cloud controller has an out-of-date version of a shared file that is known to only receive writes as file appends. When contacting another cloud controller to request a synchronization update (e.g., in response to a change notification), the two cloud controllers already know that the differences will only be in some trailing portion of the file that follows the EOF (end-of-file) for the version of the file that is on the requesting cloud controller. Thus, if the requesting cloud controller specifies the size of its version in its request, the receiving cloud controller can simply reply with the metadata and file data for the (newly appended) trailing bytes of the file (e.g., the metadata and file data for the portion of the current file that spans from the previous EOF to the current EOF), thereby avoiding the need to perform metadata comparisons for the entire file completely. In many scenarios the newly appended data is typically fairly small in size (especially in comparison to the overall size of the file), so the resulting synchronization update both involves substantially less computation overhead as well as very little network bandwidth, which facilitates quickly propagating updates across the distributed filesystem.

In some embodiments, cloud controllers are configured to automatically piggy-back the size information for their local version of a file onto a synchronization request when requesting the latest version of a file that has been identified to (1) need collaboration support and (2) receive only append-only writes. For instance, a cloud controller requesting a write lock or a synchronization update for such a file knows that it will need the most recent file version, and hence can already include the size information in that request. Note that this size information is quite compact, so that even in situations in which the remote file version has not actually changed (e.g., in the case of a write lock request) and no updates need to be sent, having the requesting cloud controller include such size information in the request does not significantly change the request message size.

Note that the work-sharing monitor can also optimize file access behavior based on the append-only write behavior for a status log file. More specifically, if the write behavior for a shared status log file is known to be append-only, the work-sharing monitor applications on each client can also track and leverage the EOF location (e.g., the previous known size of the file) for their most recent read of the file. The work-sharing monitor application typically does not keep the file open, but instead opens, reads, and closes the file frequently. On each subsequent read attempt, the work-sharing monitor application can: (1) open the file; (2) use the tracked file size to check whether the file size has increased; (3) if so, read (and display) any new status information that follows the previous EOF and update the tracked file size appropriately; and (4) close the file again. Note also that a cloud controller that receives a change notification for a status log file from another cloud controller can determine whether any client is still accessing the file. If not, the cloud controller may simply cache the change notification and not update the file. Alternatively, if one or more clients are known to still be accessing the file the cloud controller might either: (1) pre-emptively synchronize the new version of the file; or (2) wait until the next actual write access by the design software or the next read access from the work-sharing monitor before synchronizing. In the read case, the work-sharing monitor can automatically detect the size change after the cloud controller has synchronized the file, retrieve the new portion of the file, and update its project status display appropriately.

Note that while the above techniques are explained in the context of shared status log files and exemplary construction design projects, such techniques are not limited to this specific file type, project type, or industry, and may be applied in any distributed filesystem scenario in which distributed clients perform multiple concurrent append-only writes upon a shared file. In some embodiments the specific file types and/or situations that involve such support may be pre-specified (e.g., based on a specified file type, location in a project directory or in the filesystem hierarchy, or via a locality policy). In some alternative embodiments, cloud controllers may detect append-only writes and collaborative behavior for a file and collectively decide to enable such optimizations for that file.

Figure 10:
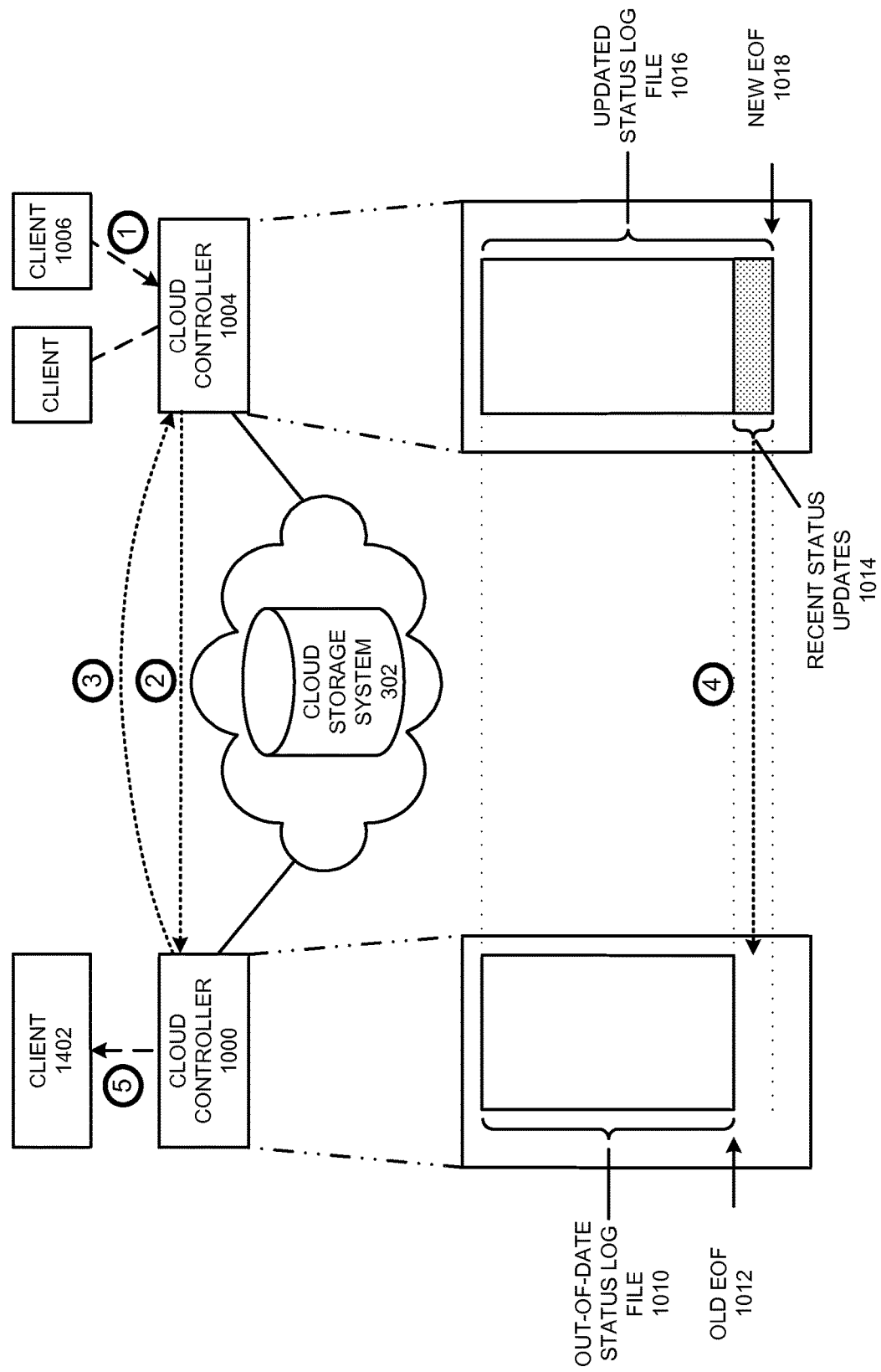
FIG. 10 illustrates a scenario in which multiple cloud controllers operate upon a shared status log file that is only modified via appending writes in accordance with an embodiment.

FIG. 10 illustrates a scenario in which multiple cloud controllers operate upon a shared status log file that is only modified via appending writes. Note that while only two cloud controllers are illustrated in FIG. 10, the described techniques can scale to a distributed filesystem with an unlimited number of cloud controllers.

At the start of the exemplary scenario of FIG. 10, users executing design software on clients 1002 and 1006 open the same set of project files. One of these project files, "Z.slog," is determined by the two clients' associated cloud controllers (1000 and 1004) to be a status log file that needs support for multiple concurrent writes and receives append-only writes. For instance, the cloud controllers may make this determination based on one or more of the following: (1) the design software opening file Z.slog using a special write-only access mask and a specific sharing mode; (2) the cloud controllers being configured to have special rules that are associated with a ".slog" extension; and (3) the work-sharing monitor on clients 1002 and 1004 simultaneously requesting read-only monitoring on the file in parallel with the design software's requested write-only access. Upon determining the need for special handling, cloud controllers 1000 and 1004 both send out registration notification messages to all of the other cloud controllers in the distributed filesystem to ensure that they will be notified of any changes to file Z.slog. Note that in this example cloud controller 1004 is the initial owner of the EOF (append) byte-range write lock for file Z.slog.

At some subsequent time, the user on client 1006 performs an action in the design software that triggers new status information to be written to the shared status log file (operation 1). Cloud controller 1004 already has the EOF byte-range write lock for the file and thus can proceed with the file write (i.e., no other cloud controller can currently append to the file); cloud controller 1004 proceeds to append the recent status updates 1010 to the status log file, resulting in updated status log file 1016. After writing the file, cloud controller sends out a change notification to all of the cloud controllers that are registered for the file, including cloud controller 1000 (operation 2). Cloud controller 1000 receives the change notification, determines that its local status log file 1010 is now out-of-date, determines (either pre-emptively or in response to a file read from the work-sharing monitor on client 1002) that a synchronization update is needed for file Z.slog, and sends a synchronization update request for file Z.slog to cloud controller 1004 (operation 3). Because file Z.slog has been identified as an append-only file, cloud controller 1000 knows to include the old EOF 1012 for its out-of-date status log file 1010 in this synchronization update request. Upon receiving this request, cloud controller 1004 compares the enclosed old EOF 1012 with its updated local EOF 1018, and responds by only sending recent status updates 1014 (and deltas for any updated metadata for the status log file) to cloud controller 1000 (operation 4). The work-sharing monitor on client 1002 detects that the Z.slog file has been updated (e.g., that the EOF has changed from its previous tracked EOF) on a subsequent read request, retrieves the recent status updates that are now available from cloud controller 1000 (operation 5), and displays the status updates to the user of client 1002.

In summary, cloud controllers may be able to substantially improve collaborative file access performance for a distributed filesystem when client file accesses meet a specified set of criteria. For instance, cloud controllers can leverage byte-range locking and optimize synchronization updates to take advantage of append-only write behavior, thereby reducing the set of comparisons that need to be made on cloud controllers and reducing the amount of data that needs to be transferred over the network. Such techniques allow design tools (such as Autodesk Revit™) that use shared log files to still be used by clients over wide-area-networks from widely-distributed geographic locations; status information can be rapidly propagated through the distributed filesystem to ensure that clients can operate as if they were all located in a single location and accessing a single fileserver.

Managing Consistency Levels for Files

The previous sections disclose techniques that enable different levels of file consistency to support a range of application and/or collaborative access styles for files in a distributed filesystem. Ensuring efficient file access performance for the distributed filesystem may involve balancing the level of consistency provided for the files in the distributed filesystem based on system characteristics that include (but are not limited to): the network bandwidth and latency available between peer cloud controllers; the number of clients and the volume of client file accesses; and/or the data needed and the specific types of file accesses that are being performed by applications executing on the clients.

In some embodiments, a cloud controller receiving a client request to access a given file determines a level of consistency that is needed for the file and the request. The cloud controller uses this determination to further determine whether other cloud controllers of the distributed filesystem need to be contacted to fulfill the client request.

In some embodiments, files stored in the distributed filesystem may be categorized into two or more distinct levels of consistency, with each subsequent level involving additional communication between cloud controllers. For example, higher levels of consistency may involve contacting the cloud controller that owns a requested file to determine whether the requesting cloud controller has the most recent version of a file. As described previously, in some situations the most recent version of the file may need to be synchronized (e.g., as a set of metadata and/or data deltas) to the requesting cloud controller via a WAN, which may take considerable time depending on the file size and the amount of WAN bandwidth that is available between the two cloud controllers.

For instance, one exemplary consistency hierarchy may provide four levels of consistency:

level-zero consistency—local-only consistency for files that do not need to be kept consistent across controllers (e.g., temporary files, thumbnail cache files, files containing localized display metadata, etc). Ensuring that such files are only accessed via a local cloud controller avoids network latency and ensures that browsing performance is not negatively impacted by requests to remote cloud controllers or cloud storage systems.

level-one consistency—eventual read consistency. Files are typically read much more frequently than modified, and communicating between cloud controllers whenever a file is read or a file's attributes are queried may involve substantial overhead (especially if the WAN link between the communicating cloud controllers is slow or saturated). Hence, level-one consistency improves performance by using the most up-to-date local versions of files known of by a cloud controller for non-write requests and only checking for more recent versions of files on remote cloud controllers when files are being opened for writing. More specifically, only upon receiving a client write request does a cloud controller check to ensure that the most recent version of the requested file is available locally (e.g., by requesting any more recent version of the file from the owning cloud controller as part of a claim operation for the file, as described previously).

level-two consistency—read-after-close consistency provides additional update capabilities for applications that need strong file consistency. For instance, cloud controllers receiving a client request for a file with level-two consistency may be configured to always check with an owning cloud controller to determine whether an updated version of the file exists and, if so, synchronize the latest file updates for the file. Level-two file consistency can also involve leveraging the previously described change-notification techniques to notify registered cloud controllers of changes to such files.

level-three consistency—real-time read-after-write consistency that leverages the above-described distributed byte-range lock techniques. More specifically, applications can use byte-range locking techniques to support multiple concurrent writes to individual files in the distributed filesystem. Such techniques, in conjunction with change notification techniques, can be used to guarantee file coherency for files that are being simultaneously modified by multiple distributed clients. Subsequent paragraphs further elaborate upon some aspects of these exemplary levels of consistency.

In some embodiments, level-zero consistency can eliminate consistency restrictions and overhead for files that may be simultaneously accessed by multiple clients but do not merit additional protection. Consider, for instance, a "Thumbs.db" file that caches thumbnail images that are used when visually browsing a given directory. A client browsing to a directory will typically look for a Thumbs.db file in that directory to access the thumbnails for the other files in the same directory. If this file doesn't exist, the client creates the file, accesses the other files in the directory to generate thumbnails, and then populates the Thumbs.db file with those thumbnails. Unfortunately, such operations become more complex in the context of a distributed filesystem. For instance, consider a scenario in which multiple clients simultaneously write new, distinct image files to the directory; local processes on these clients might each respectively detect the new image files and then both attempt to create and write new thumbnails to that directory's Thumbs.db file at the same time. While the previously described techniques could be used to enforce serial access to the file (e.g., via explicit claim operations and locking) and/or allow multiple concurrent access (via byte-range locking), Thumbs.db files (in addition to being very common) are not considered to be of high importance for collaborative and synchronization purposes, and thus might not justify the higher network and cloud controller overhead involved in such techniques. As an alternative, cloud controllers may be configured to use a range of additional specialized techniques to handle files that have been marked for level-zero consistency.

In some embodiments, claim and synchronization operations are disabled for files that have been marked for level-zero consistency, thereby allowing multiple clients to simultaneously write to such specified files without restriction. In this scenario, each cloud controller maintains separate, independent contents for such files, and does not propagate changes to these contents to the cloud storage system nor to the other cloud controllers (via incremental metadata updates). As a result, the contents of such files may fork (becoming different, and potentially incompatible) on different cloud controllers, with each client accessing a given cloud controller now accessing and updating that cloud controller's local version of the file. Note that the first cloud controller receiving a client request to create such a file may still convey the existence and status of the new file to all of the other cloud controllers via an incremental metadata snapshot. More specifically, this snapshot indicates that the file has level-zero consistency, thereby indicating that the file should not be synchronized and that local versions should instead be managed separately by each cloud controller. In such embodiments, the multiple versions of a given file that are maintained separately by multiple cloud controllers are independent and might never be merged.

Note that such techniques can eliminate some network delay and overhead (e.g., by not requiring claim operations/locks or synchronization updates for such files), but may still involve some additional network bandwidth and overhead. For instance, consider a situation in which a client accesses the Thumbs.db file for a directory via a cloud controller that does not yet have any local data for that file and is not caching any of the file data in that directory. This Thumbs.db file may have already been created and fully populated on another cloud controller, but because of level-zero consistency is not available to the current cloud controller. In this scenario, the accessing client might request all of the files in that directory to generate the thumbnails, prompting the cloud controller to download any uncached contents of those files from the cloud storage system. Such operations can consume substantial network bandwidth (and involve potential network delay), especially if multiple distributed clients are performing such operations at the same time. However, once the file has been created and populated for a given cloud controller, subsequent actions that accessed the same directory via the same cloud controller would not have to start from nothing again, but instead would only need to generate additional thumbnails for any new files (or file updates) that have not already had up-to-date thumbnails generated and included in the cloud controller's local version of the Thumbs.db file.

Duplicating thumbnail generation on multiple client devices is typically not an issue (e.g., compute cycles on client computing devices are typically readily available and considered "cheap"), but network bandwidth and low latency are very precious commodities for a distributed filesystem. Hence, in some embodiments, cloud controller support for level-zero consistency may be extended to reduce the amount of network bandwidth that is needed to independently generate files with level-zero consistency. For instance, cloud controllers may be configured to provide file support that does not require claim operations or real-time synchronization but still facilitates later propagation of changes. In some scenarios, such techniques may involve identifying a "master copy" of a file and periodically deleting all locally maintained versions of the file to revert to the master copy. For example, in the context of the Thumbs.db example described above, one cloud controller (e.g., the owning controller) may be identified as the "master" for that file, and still send out incremental metadata snapshot updates for that file and write the file contents to the cloud storage system. Other cloud controllers receiving a client request for that file, upon determining that they do not yet have a local version of that file, may: (1) determine the master copy for the file from a previously received incremental metadata snapshot for the file; (2) use the received metadata for the file retrieve the file data for the most recent version of that master copy from the cloud storage system (or access the metadata and file data from the owning cloud controller via a synchronization update); and (3) proceed from there using that master copy as their initial local version of the file. Cloud controllers that already have a local version of the file may, upon a subsequent client access: (1) compare the file size and/or time stamp of their local version of the file with those in the most recent incremental metadata snapshot for the master copy of the file; and (2) if the master copy appears to be substantially more recent, may discard its current local version in favor of downloading the master copy. More specifically, a cloud controller may be configured to determine whether downloading an up-to-date copy of the master copy of a file is advantageous over updating a local version of the file (in terms of network bandwidth trade-offs or other criteria), and act accordingly.

Note that in some embodiments, the cloud controller managing the master copy of a file may also change; for instance, for some file types (such as Thumbs.db), it may make sense for the most recent version of a file to be considered the master copy for the file. For example, in the context of a Thumbs.db file, the most recently updated local version of a Thumbs.db file may be the version that most accurately reflects the current contents of the associated directory. Hence, in some embodiments, cloud controllers may be configured to communicate more recent modifications to level-zero consistency files and provide mechanisms to access such versions in a manner that does not require higher-level consistency guarantees. Note also that while these and the preceding examples frequently refer to Thumbs.db files, the above-described techniques for level-zero consistency can be applied to a wide range files that do not need distributed consistency (including, but not limited to journal files, local statistics files, log files, etc.).

Figure 12A:
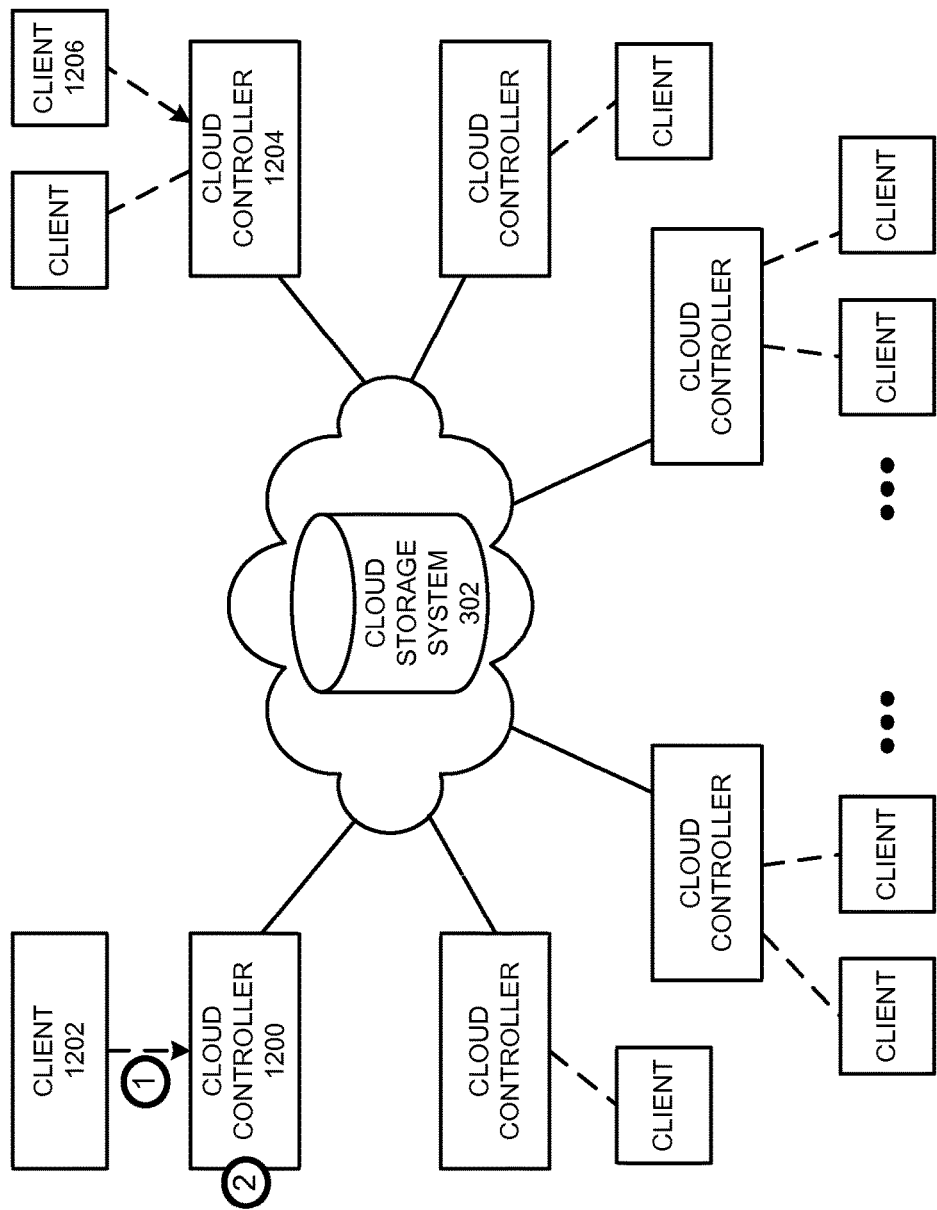
FIG. 12A illustrates an exemplary scenario in which a client accesses a file that has been categorized with level-zero consistency in accordance with an embodiment.

FIG. 12A illustrates an exemplary scenario in which a client 1202 accesses a file that has been categorized with level-zero consistency (operation 1). The cloud controller 1200 receiving a request from client 1202 detects the file's level-zero categorization, and handles the request using only whatever data (and/or metadata) is locally available for the file (operation 2). In one configuration, if the file already exists, cloud controller 1200 might download the file contents from cloud storage system 302 but not contact any other cloud controllers to determine whether the locally-cached metadata for the file is up-to-date or a more recent of the file exists. In another configuration, cloud controller 1200 might be configured to not even contact cloud storage system 302 at all for a file with level-zero consistency, but instead only use (and/or supplement) any locally-cached data that is available for the file. For instance, cloud controller 1200 may determine from its cached metadata that the file exists on another remote cloud controller but that no local version exists yet, and thus inform client 1202 that the file was not found. For example, consider a request for a "Thumbs.db" file; if a local version of the file does not already exist, cloud controller 1200 returns "file not found" to client 1202, which then proceeds to create the file and access the contents of the directory to generate and store thumbnail images. Cloud controller 1200 writes these contents to a local version of the file that is not be propagated to the other cloud controllers for the distributed filesystem.

In some embodiments, cloud controllers may also be configured to leverage application-level knowledge to further optimize performance (and/or other aspects of system behavior). For instance, for a Thumbs.db file, a cloud controller receiving a client request for a currently non-existent (or locally non-existent) Thumbs.db file may be configured to automatically generate the file and populate it with a set of default thumbnail images for the files in the directory. This capability ensures that the file is created quickly and that a (default) set of thumbnail images are immediately available for browsing, and also avoids a potential immediate spike in network accesses by the cloud controller in response to client requests for the files in the directory (to create the actual non-default thumbnails). The cloud controller may then also subsequently retrieve a master copy containing accurate thumbnails (or update the content of the previously generated file to include the appropriate non-default data if the associated files are downloaded and cached by the cloud controller during normal file accesses). Note, however, that any application-level functionality provided by a cloud controller may become problematical if the associated application changes (e.g., between application versions), and thus may be used only for applications that are unlikely to change or in situations that involve very concrete advantages.

Figure 12B:
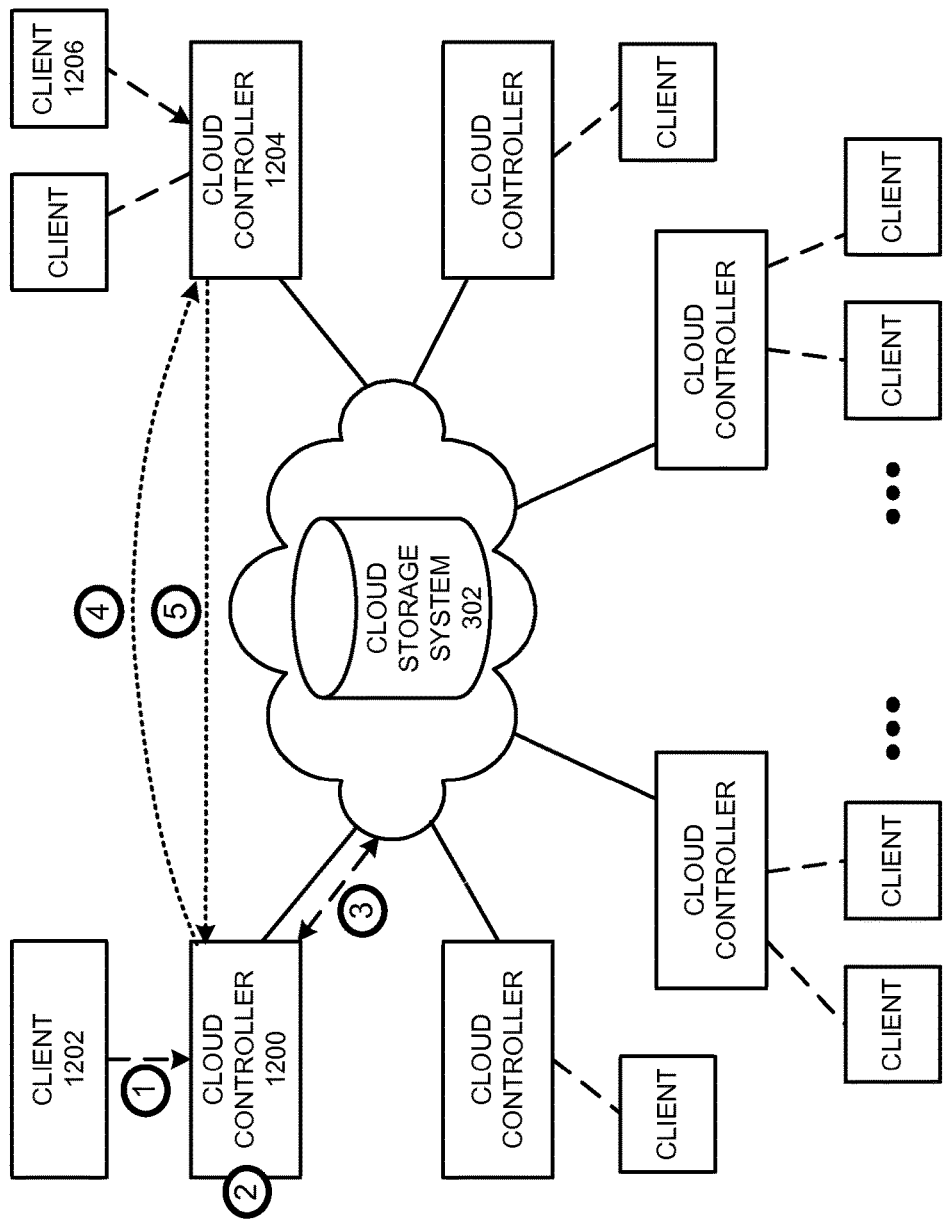
FIG. 12B illustrates an exemplary scenario in which a client accesses a file that has been categorized with level-one consistency in accordance with an embodiment.

FIG. 12B illustrates an exemplary scenario in which client 1202 attempts to access a file that has been categorized with level-one consistency (operation 1). If client 1202 is requesting read access for the file, cloud controller 1200 uses its most recent cached metadata for the file (operation 2) and can access data blocks for the file either from its local cache or from cloud storage system 302 as needed (operation 3). If, however, client 1202 is requesting write access, cloud controller 1200 determines the owning cloud controller for the file (e.g., cloud controller 1204) (operation 2), contacts cloud controller 1204 to request write permission to the file (operation 4), and requests and retrieves any recent modifications to the file (as described in the previous sections) (operation 5).

In some embodiments, choosing level-one consistency as a default for a majority of the files in the distributed filesystem facilitates balancing general performance and fault-tolerance; incremental metadata snapshots ensure that read operations for files that are categorized with level-one consistency still access relatively up-to-date metadata, while only less-frequent write operations incur the overhead of communicating with (potentially remote) cloud controllers. Note, however, that this consistency level can lead to some potential inconsistency from the application viewpoint. More specifically, an application accessing a file is not guaranteed that the file will be up-to-date until it opens the file for writing, which can lead to some issues. For instance, an application that first opens a file for reading and then later attempts to add write access might initially access an outdated version of the file (during the read access) and then read and overwrite the latest data in the updated version (due to the write access), thereby resulting in potential file corruption. To avoid such issues, an application may be configured to already open a file with both read and write access (or with exclusive access) from the start to ensure that the file cannot change in the background prior to the write operation.

Because the exemplary level-one file consistency as described does not include change notification, some scenarios may arise in which a cloud controller receives an incremental metadata snapshot that updates a file that is currently being read by a client. Note that if the client was writing the file the cloud controller would have already received the most recent copy (to ensure data integrity), but because the client is performing a read operation the cloud controller has not checked with any peer cloud controllers to determine whether a newer version of the file exists. In some scenarios, an application that already has the file open may continue to use the old version of the file until after the file has been closed and re-opened. In other scenarios, the response to a file change may be application-specific; for example, some applications may detect a file change, notify a user, and then re-load the file, while other applications may be configured to only detect and access updated file data after the file is closed.

Level-two file consistency ensures that both read and write operations access the most up-to-date versions of file. For instance, cloud controllers may: 1) use the previously-described change notification techniques to request change notifications for files that have been categorized with level-two consistency; and/or 2) upon receiving a client request for such a file, contact the owning cloud controller for the file to check whether an updated version of the file exists (and, if so, to synchronize any updates). Note that in some embodiments, cloud controllers may sometimes need to initially use a stale set of file attributes (e.g., metadata-based attributes that describe aspects of the file, such as file size, time stamps, etc.) and/or update file attributes when synchronizing the latest version of a file.

In some embodiments cloud controllers may be configured to support read-after-close consistency for level-two file consistency. Recall that in some scenarios one client may have such a file open for shared read while another client is writing the file (but allowing shared access). In this scenario, if read-after-close consistency is desired, cloud controllers might be configured to send updates and change notifications every time a client closes any data for the file. In this case, the client reading the file might begin by accessing the previous version of the file while the other controller is writing the file, and then receive updates as data blocks are modified. Such situations could lead to inconsistency, and hence applications may need to be specially configured to detect and handle such changes. For read-after-close consistency, the client reading the file would similarly initially access the previous version of the file, and then receive an oplock break on the open handle. This oplock break would prompt the client to close the file handle and re-open the file to access the most recent file data, as described in previous sections.

In some embodiments, different files in the distributed filesystem can be associated with different levels of consistency. Different files in the same directory may be associated with different levels of consistency. For example, an exemplary directory may include a thumbnail cache file that has level-zero consistency, an slog file that has level-three consistency, and a project file that has level-two consistency. Furthermore, in some embodiments the consistency level for individual files can be dynamically adjusted based on a range of factors. For instance, the consistency level for files may initially be determined based on file type and expected file access patterns, and then later be dynamically adjusted based on actual access patterns, available compute resources, and available network bandwidth to balance performance and file consistency. For example, image files (e.g., files with a .jpg extension) may me be determined to be infrequently edited, and thus may have a default categorization of level-one consistency, while file types that are known to be associated with distributed, collaborative projects may be initially categorized with higher consistency levels. Users, clients and/or cloud controllers may also be able to specify a minimum (and/or maximum) collaboration level for files; for instance, such specifications may be based on (but not limited to) file name, expected accesses, file location (e.g., either geographic location or location in the distributed filesystem hierarchy), file type, the application accessing the file; file access patterns, and/or other heuristics.

Figure 13:
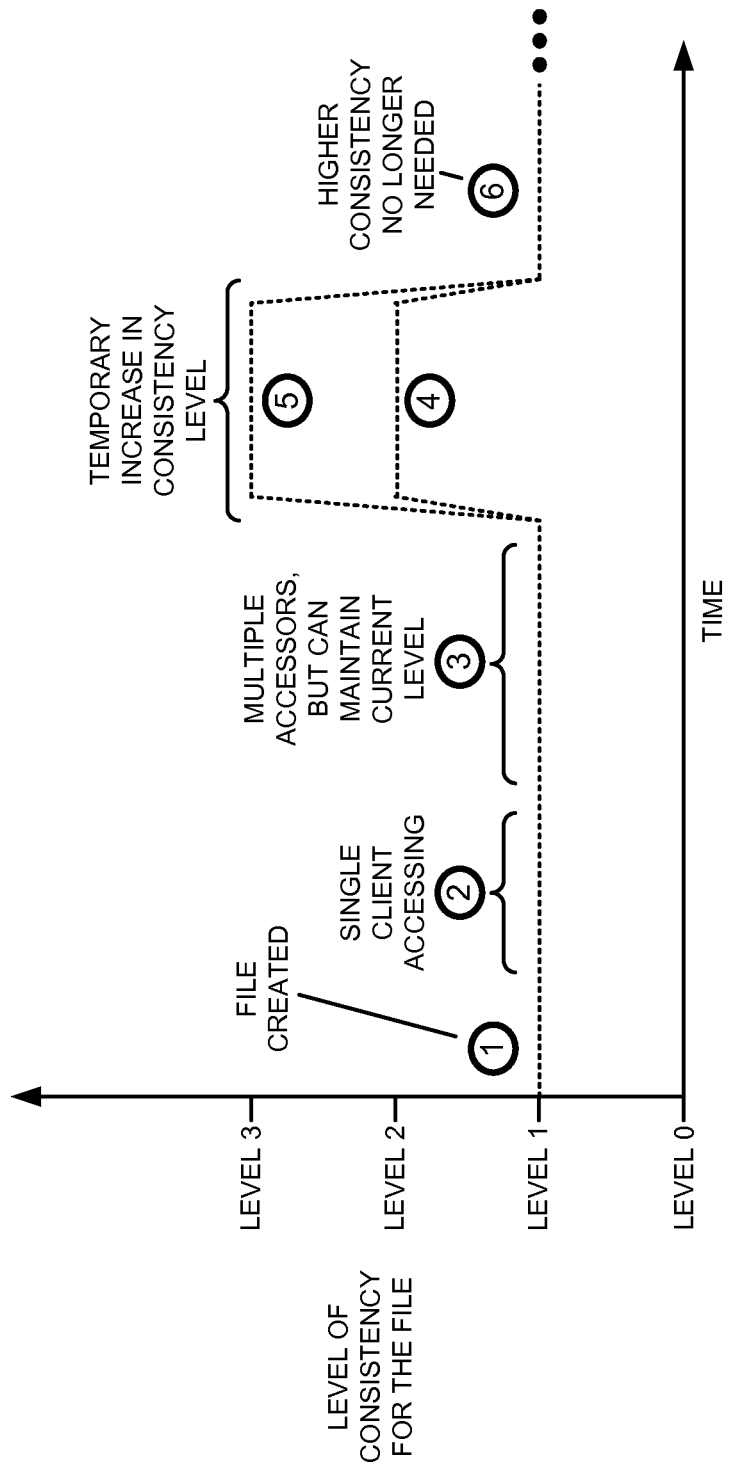
FIG. 13 illustrates an exemplary scenario in which the consistency level for a file changes over time based on a range of potential factors in accordance with an embodiment.

FIG. 13 illustrates an exemplary scenario in which the consistency level for a file changes over time based on a range of potential factors. The file is initially created by a first client; the cloud controller receiving the request determines that the file name and file type are not specified to have either level-zero consistency or known higher-consistency-level characteristics, and thus sets the initial consistency for the file to a default of level-one consistency (operation 1). The owning cloud controller for the file tracks subsequent accesses for the file; while the file is being accessed by a single client (operation 2), the cloud controller does not determine any compelling need to change the file's consistency level. At some later point, however, additional clients begin to access the file as well. A cloud controller (e.g., the owning cloud controller, or alternatively one or more other cloud controllers) detects and tracks these additional accesses, and determines based on the access patterns and other system characteristics whether any changes need to be made. For instance, the owning cloud controller might not make any changes (operation 3) if: (1) all of the clients accessing the file are associated with the same cloud controller (e.g., the accesses are not distributed beyond a single geographic site, other peer cloud controllers are not involved, and that site's cloud controller can adequately manage the consistency for the multiple clients already); (2) all of the clients are predominantly reading the file (e.g., there are no conflicts and thus higher consistency is not needed at this time); and/or (3) cloud controller and network load for the affected cloud controllers are already high, and the trade-off between increasing the level of consistency for the file and increasing network traffic is currently unfavorable.

At another subsequent point in time, the owning cloud controller determines that the situation has changed such that a higher level of consistency is now beneficial, needed, or otherwise justifiable. For example, the owning cloud controller might change the consistency level for the file to level two (operation 4) if: 1) a certain threshold in the number of accessing clients and/or different types of simultaneous accesses is reached; 2) multiple clients are collaboratively accessing the file from different cloud controllers and making (possibly frequent) changes that need to be propagated between cloud controllers quickly to maintain file consistency; and/or 3) sufficient network bandwidth and cloud controller resources are available for change notification messages. Alternatively, the owning cloud controller might change the consistency level for the file to level three (operation 5) if multiple writers are requesting to simultaneously write different portions of the file.

File accesses often follow temporal locality, so after a peak interval of collaborative accesses the file may again return to being accessed less frequently and/or by fewer clients. The owning cloud controller may detect a decrease in accesses, and (perhaps after waiting for a specified interval) determine based on the access trends and other factors (e.g., time of day, client access patterns, etc.) that the level of consistency for the file can be reduced to level-one again (operation 6). In general, cloud controllers need to ensure that reductions in consistency levels do not violate specified minimum consistency levels for files, result in lost data, or adversely affect applications. In some implementation, cloud controllers may be configured to consider a multi-dimensional matrix that associates application behavior and file types, the number and types of accesses, and other factors when determining whether (and how) to change the consistency levels for a file. Note that such changes may need to be propagated (or otherwise communicated) to other peer cloud controllers, and hence may only take effect after a brief delay. For instance, in some embodiments all of the cloud controllers need to support the same consistency level for a file to guarantee that level of consistency. In such embodiments, the consistency matrix may need to be communicated globally (and acknowledged) for any changes. In one scenario, individual cloud controllers may send bandwidth, latency, and other status information to a master controller that calculates the "best" consistency level for each file type and/or project (e.g., the highest supportable levels of consistency given the current resources, file types, and/or other criteria). The master controller then communicates any resulting changes in levels of consistency to the other cloud controllers as they change. Note that the consistency matrix may need to be stored in nonvolatile storage to ensure that cloud controllers can immediately support the appropriate level of consistency for a file after any reboot or upgrade.

Figure 14:
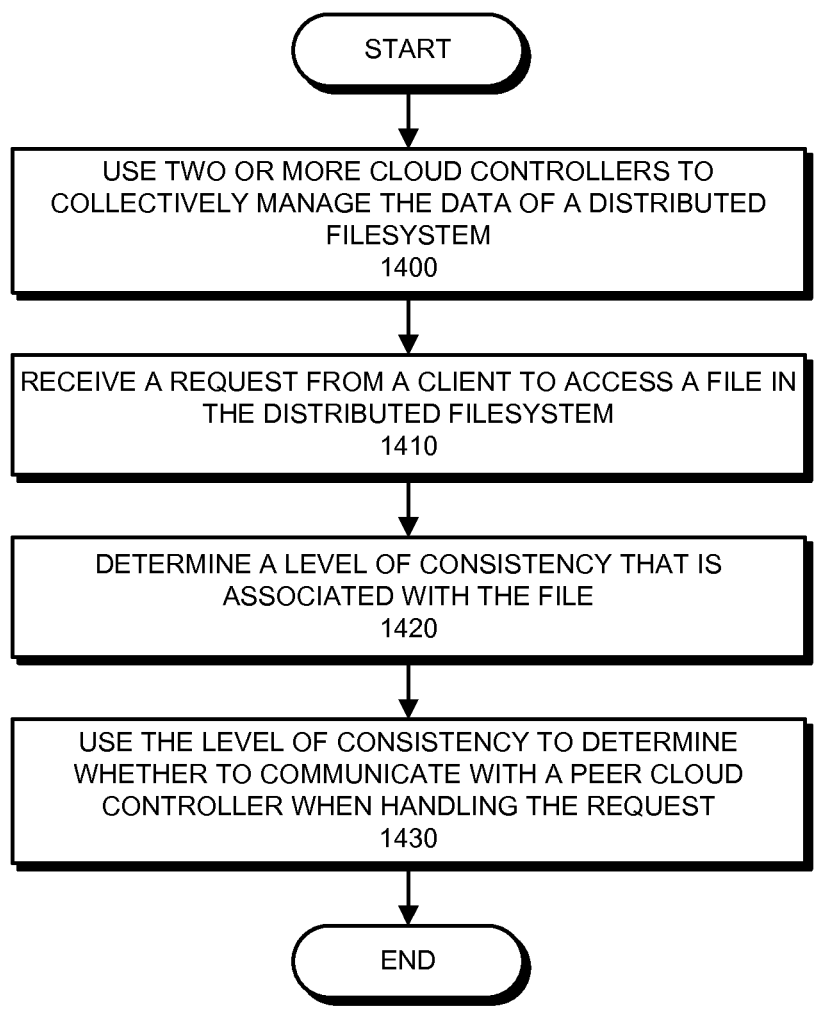
FIG. 14 presents a flow chart that illustrates the process of managing consistency for a file in a distributed filesystem in accordance with an embodiment.

FIG. 14 presents a flow chart that illustrates the process of managing consistency for a file in a distributed filesystem. Two or more cloud controllers collectively manage distributed filesystem data that is stored in the cloud storage systems (operation 1400); the cloud controllers ensure data consistency for the stored data, and each cloud controller caches portions of the distributed filesystem. During operation, a cloud controller receives from a client a request to access the file (operation 1410). The cloud controller determines a level of consistency that is associated with the file (operation 1420), and then uses this level of consistency to determine whether to communicate with a peer cloud controller when handling the request (operation 1430).

In summary, cloud controllers that manage a distributed filesystem can be configured to enable different levels of file consistency to support a range of application and/or collaborative file access styles. Higher consistency levels facilitate collaborative accesses for distributed clients but may involve additional communication between cloud controllers. Cloud controllers can dynamically adjust the consistency level for individual files as needed based on system and access characteristics to balance performance, fault-tolerance, and application-specific requirements.

Sending Interim Notifications to Clients

As described in preceding sections, different client file access requests in a distributed filesystem may involve a range of cloud controller actions and network interactions. For instance, the number of remote interactions associated with a file access may vary based on the level of consistency that is associated with the file, recent client operations upon the file (by both local and remote clients), the set of file data being cached by the cloud controller, and other factors. Client computing devices, however, may be unaware of all of the factors involved in a file access (or may potentially even be unaware that they are accessing a distributed filesystem), and thus may be configured to abort the file access attempt and flag an error if a given request is not serviced within a specified timeout interval that does not consider network delays.

Consider a file read request (e.g., a READ operation in the CIFS and/or SMB protocols). Any file read request may trigger a download from a cloud storage device. Furthermore, in some instances (e.g., depending on the file's consistency level) a file read request may also involve contacting the owning cloud controller for the file to ensure that read access can be granted and/or a synchronization request to another peer cloud controller that has recently modified the requested file. While some of the previously described techniques disclose metering data transfers from the cloud controller to the client to keep a data connection open (as described in pending U.S. patent application Ser. No. 13/971,621, filed 20 Aug. 2013, entitled "Avoiding Client Timeouts in a Distributed Filesystem," by inventors Richard Sharpe, John Richard Taylor, and Randy Yen-pang Chou, which is incorporated by reference in its entirety), if the time interval required to retrieve an initial set of data from a remote cloud storage system or cloud controller exceeds the client timeout interval, the requesting client may time out the request and signal an error for the file read request, which is undesirable.

A file write request (e.g., a CREATE operation in the CIFS and/or SMB protocols, which may include a number of flags that select file create and/or write options) typically involves even more remote requests than a file read request. More specifically, a write operation may also involve a claim request to the cloud controller that owns the file as well as read and/or synchronization requests that ensure that the cloud controller has the most recent copy of the file. Even if cloud controllers use the above-described synchronization optimization techniques, in some situations network delays, network traffic, or other factors can substantially delay an operation and lead to the client timeout interval being exceeded.

In some embodiments, cloud controllers are configured to determine whether a client file access request will involve remote operations and, if so, signal to the requesting client that the file access is pending and should not be abandoned. For instance, a cloud controller receiving a client request to access a file may check the metadata for the file to determine whether a remote operation is needed (e.g., based on the type of access being requested and the current consistency level for the file), initiate one or more remote operations, and send an interim response to the client to indicate that a response is pending. For example, for the CIFS and/or SMB protocols a cloud controller might send an interim "PENDING" response that indicates to the client that the cloud controller is working on the request, and that the client should not abort the request and/or drop the connection.

In some embodiments, a cloud controller can delay sending an interim notification for an initial time interval (e.g., for a portion of the client timeout interval, if known) to give the remote operations more time to complete. For instance, a cloud controller may track the delays associated with different cloud controllers and file request types, use such information to calculate an anticipated delay for different remote operations, and then use the tracking information and calculations to determine whether and/or when to send an interim response. Such techniques may be especially beneficial for protocols that only allow one interim response to be sent to a client. Note that in some alternative embodiments where multiple responses can be sent to clients, the cloud controller may determine that a remote operation may involve substantial delay (or be taking longer than expected) and send multiple subsequent pending indications to indicate to the client that the requested operation has not failed, but just needs more time to complete.

Figure 15:
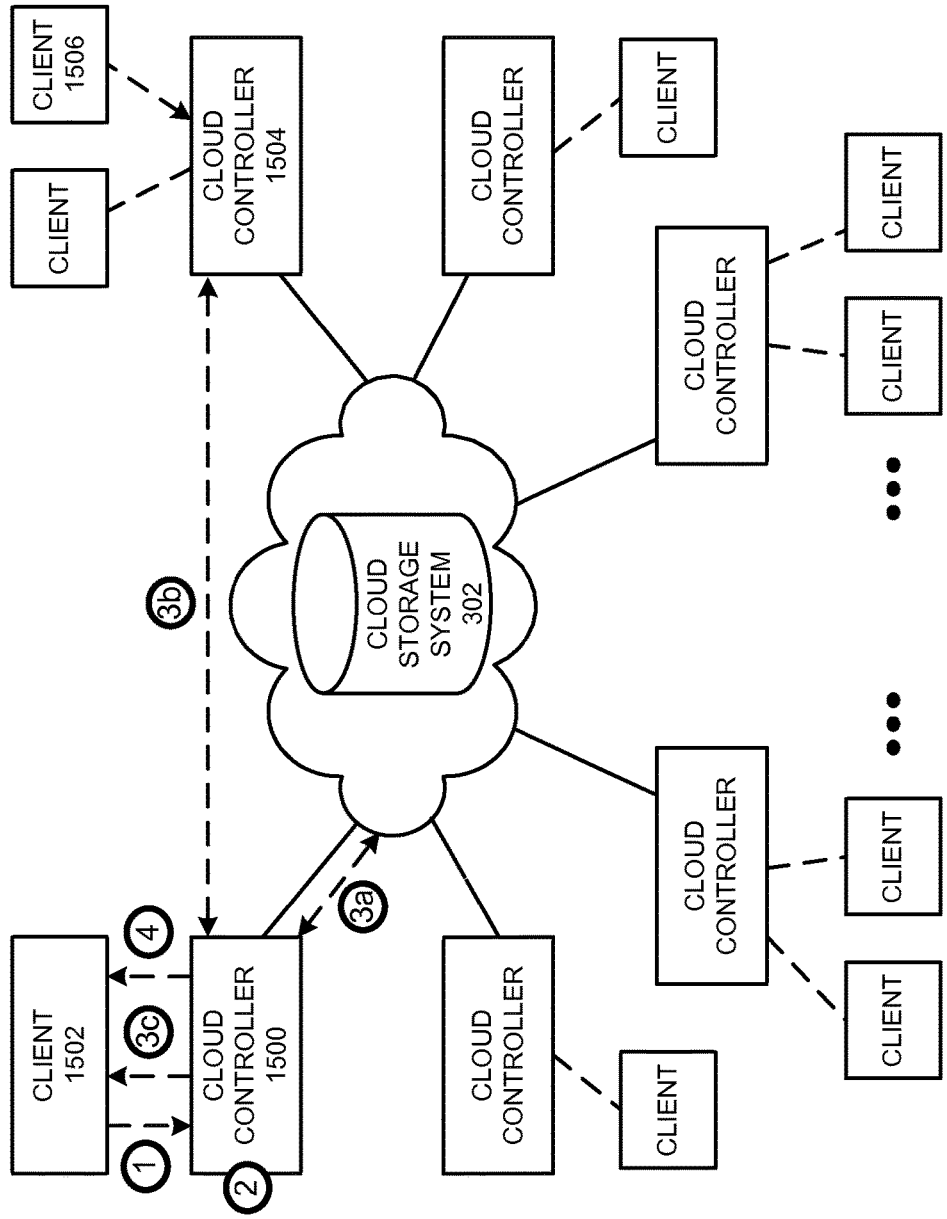
FIG. 15 illustrates a scenario in which a client contacts a cloud controller to access a file in the distributed filesystem and receives an interim notification from the cloud controller in accordance with an embodiment.

FIG. 15 illustrates a scenario in which a client 1502 contacts a cloud controller 1500 to access a file in the distributed filesystem and receives an interim notification from cloud controller 1500. More specifically, during operation, client 1502 contacts cloud controller 1500 with a file read and/or write request (operation 1). Cloud controller 1500 determines whether the client request involves any remote requests to cloud storage system 302 or one or more remote cloud controllers (e.g., cloud controller 1504). If not, cloud controller 1500 can address the request and reply directly to client 1502 (operation 4), and no interim notifications are needed. If, however, cloud controller 1500 determines that the client request involves a request to cloud storage system 302 (operation 3a) and/or a remote cloud controller such as cloud controller 1504 (operation 3b), cloud controller 1500 may send one or more interim notifications (e.g., "PENDING" responses) to client 1502 in parallel (and/or subsequent to) sending the remote requests (operation 3c). Interim notifications ensure that client 1502 is informed of the (potential) delays and does not abandon the request due to the delay. Once any needed remote requests have completed, cloud controller 1500 sends an appropriate response for the request to client 1502 (operation 4). Note that, as described above, cloud controller 1500 may take advantage of knowledge of client timeout intervals to optimize the timing for interim notifications. For instance, if cloud controller 1500 determines (or is informed) that a typical client timeout interval is one minute, cloud controller 1500 can determine whether remote operations are likely to exceed the timeout interval and use the timeout interval knowledge to send timely interim notifications to client 1502 that discourage client 1502 from abandoning the file access request prematurely.

In some embodiments, using interim notifications can improve performance for both cloud controllers and clients, especially if either computing device otherwise would use synchronous operations for any aspects of file accesses. More specifically, interim notifications can facilitate making file operations asynchronous (e.g., non-blocking). For instance, a client that otherwise might busy-wait on a reply from a file server (e.g., a cloud controller) might instead be able to instead proceed to perform other operations after receiving an interim response. For example, a multi-threaded client file browsing application that is generating thumbnails for a directory (and thus needs to access the contents of many files in that directory, as described previously) can leverage such asynchronous operations to launch multiple requests in parallel. For example, the client can continue to request other files irrespective of any pending remote operations, while also operating immediately upon file data that is immediately available from the local cloud controller and (indirectly) initiating additional remote operations via the cloud controller for any other needed file data that is not yet available on the local cloud controller.

Note that clients (and/or client applications) may be limited to a specified number of outstanding file access requests to a cloud controller; this limitation may be implemented on either (or both of) the client or the cloud controller. In some embodiments, clients may be configured to make use of this knowledge, in combination with interim notifications, to further optimize performance. For instance, a client that needs to operate upon many files in rapid succession may choose to abandon requests that return an interim response in order to access other files; in some implementations a cloud controller may still complete the remote operations associated with the canceled requests and may then already have the updated file data and/or access permissions available if the client re-tries the request again later.

Support for asynchronous (non-blocking) operations on a cloud controller allow the cloud controller to respond to other clients requests while waiting for latent remote operations to complete, thereby lowering response times and improving general file access behavior for clients. For instance, if multiple client requests (either from the same or different clients) involve remote operations, an asynchronous cloud controller can, instead of busy-waiting for a remote operations: (1) initiate a first remote operation; (2) send an interim notification to the requesting client; and then (3) service one or more additional client requests and, if needed, initiate one or more additional remote operations that will be processed (remotely) in parallel.

Figure 16:
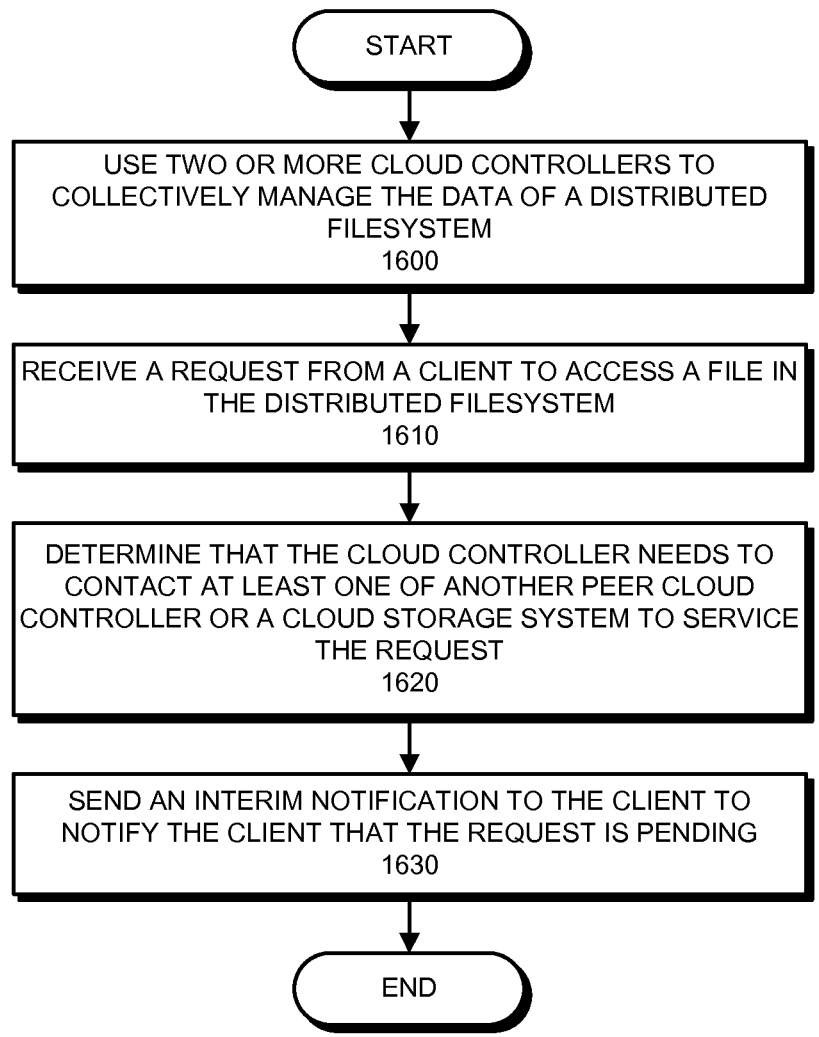
FIG. 16 presents a flow chart that illustrates the process of sending interim notifications to a client of a distributed filesystem in accordance with an embodiment.

FIG. 16 presents a flow chart that illustrates the process of sending interim notifications to a client of a distributed filesystem. Two or more cloud controllers collectively manage distributed filesystem data that is stored in one or more cloud storage system (operation 1600); the cloud controllers ensure data consistency for the stored data, and each cloud controller caches portions of the distributed filesystem. During operation, a cloud controller receives a client request to access a file (operation 1610). The cloud controller determines that it will need to contact at least one of another peer cloud controller or a cloud storage system to service the request (operation 1620), and sends an interim notification to the client to notify the client that the request is pending (operation 1630).

In summary, cloud controllers can be configured to send interim notifications to clients whose file access requests involve remote operations that include (but are not limited to) file opens, file reads, file writes, file and/or directory renaming, and byte-range locking of file content. These interim notifications signal to clients that requests are still pending and give cloud controllers more time to service requests that involve remote operations without the respective client giving up. Such interim notifications also facilitate asynchronous (non-blocking) execution on both the client and cloud controller, thereby improving file access performance and efficiency.

Computing Environment

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. Additional techniques can be applied to reduce access and propagation delays for files that are being collaboratively edited and/or accessed by remote clients via different cloud controllers. Hence, the disclosed embodiments present an abstraction of one global, extensible filesystem while preserving the abstraction of high-speed local data access.

Figure 4:
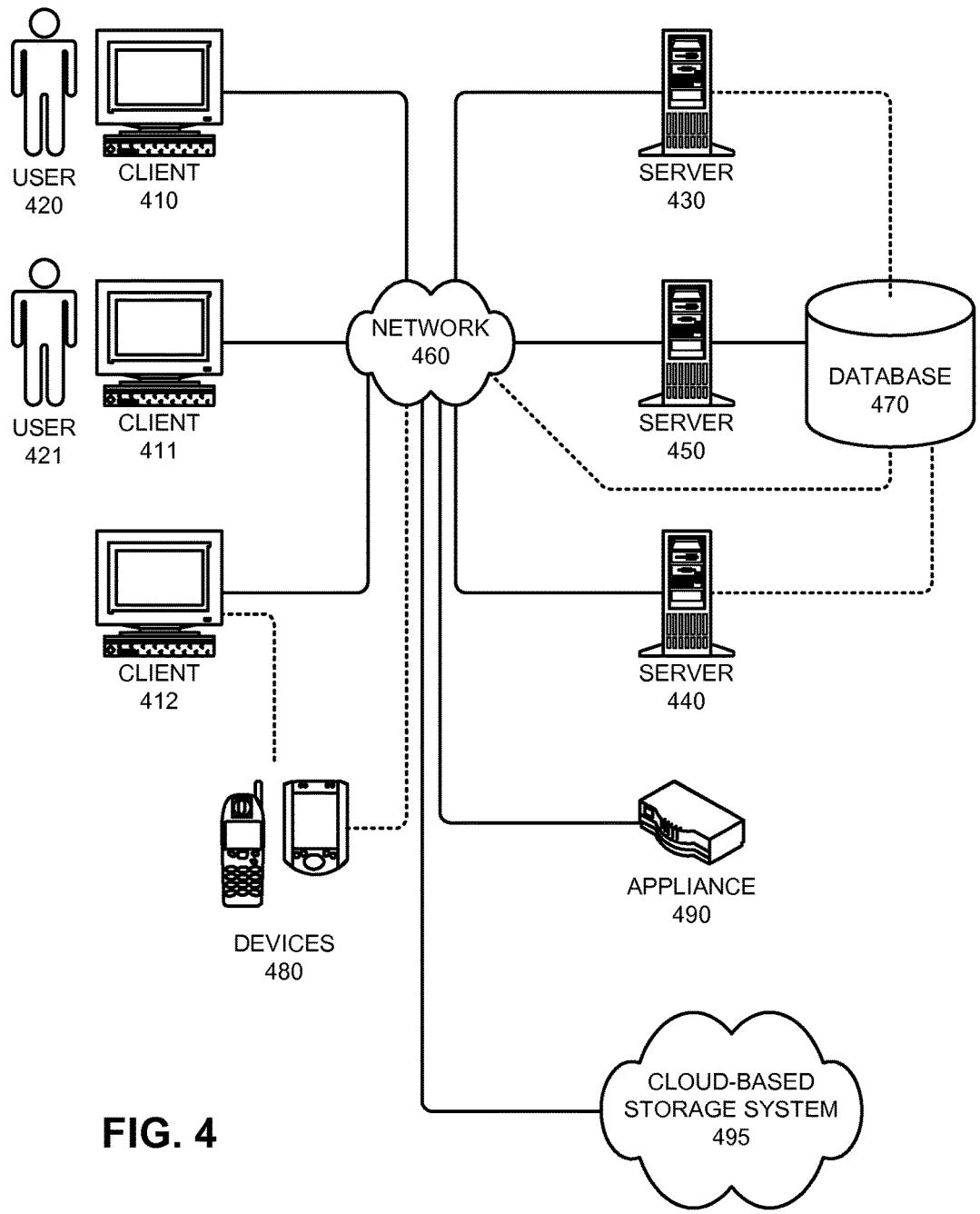
FIG. 4 illustrates a computing environment in accordance with an embodiment.

In some embodiments of the present invention, techniques for managing and/or accessing a distributed filesystem can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
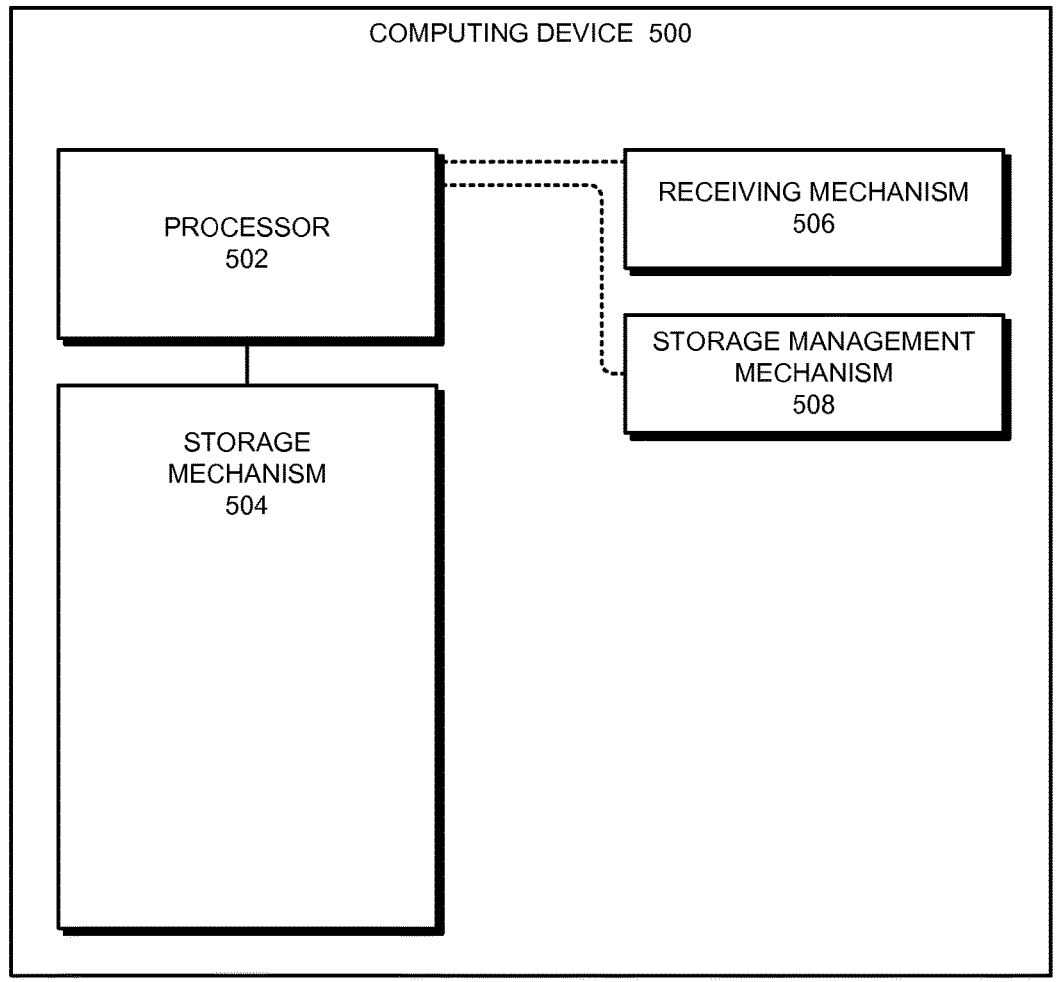
FIG. 5 illustrates a computing device in accordance with an embodiment.

FIG. 5 illustrates a computing device 500 that includes a processor 502 and a storage mechanism 504. Computing device 500 also includes a receiving mechanism 506 and a storage management mechanism 508.

In some embodiments, computing device 500 uses receiving mechanism 506, storage management mechanism 508, and storage mechanism 504 to manage data in a distributed filesystem. For instance, storage mechanism 504 can store metadata for a distributed filesystem, and computing device 500 can use receiving mechanism 506 to receive a request to access a data block for a file. Program instructions executing on processor 502 can traverse the stored metadata to identify a metadata entry that is associated with the data block. Storage management mechanism 508 can use this metadata entry to download a cloud file containing the data block from a cloud storage system.

In some embodiments of the present invention, some or all aspects of receiving mechanism 506, storage management mechanism 508, and/or a filesystem device driver can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 506, storage management mechanism 508, and/or a filesystem device driver may be performed using general-purpose circuits in processor 502 that are configured using processor instructions. Thus, while FIG. 5 illustrates receiving mechanism 506 and/or storage management mechanism 508 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for sending interim notifications to a client of a distributed filesystem, the method comprising:

collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems;

receiving at a first cloud controller a request from the client to access a file, wherein the client is configured to abort the request if the duration of the request exceeds a timeout interval;

determining from at least one of a level of consistency associated with the file and the type of file access being requested by the client for the file that the first cloud controller needs to initiate a remote request to contact at least one of a second, distinct cloud controller or a cloud storage system to service the request, wherein the first cloud controller determines that the request comprises a write operation that accesses the most recently updated version of the file, wherein the second cloud controller is the owning cloud controller for the file, wherein the remote request comprises contacting the second cloud controller to synchronize recent updates for the file to the first cloud controller and to claim ownership for the file to facilitate client write access for the file; and sending an interim notification from the first cloud controller to the client before the timeout interval expires to notify the client that the request is pending and to ensure that the client does not abort the request, wherein sending the interim notification comprises tracking a set of delays associated with accessing the second cloud controller, determining from the tracked information that the remote request is likely to exceed the client timeout interval, and ensuring that the client receives the interim notification before the timeout interval is exceeded.

2. The computer-implemented method of claim 1, wherein sending the interim notification to the client further comprises:
calculating an initial interval that gives the remote request as much additional time as possible while also ensuring that the timeout interval is not exceeded; and
delaying sending the interim notification from the first cloud controller to the client until the initial interval has expired.

3. The computer-implemented method of claim 1, wherein sending the interim notification to the client further comprises:
determining that the remote request may involve substantial delay that exceeds multiple client timeout intervals; and
sending multiple interim notifications to the client to indicate to the client that the request is still pending but needs additional time.

4. The computer-implemented method of claim 1,
wherein the client is configured to send asynchronous file access requests to the first cloud controller; and
wherein, upon receiving the interim notification, the client proceeds to initiate other file operations and file requests to the first cloud controller instead of busy-waiting for the request, thereby improving file access performance for the client.

5. The computer-implemented method of claim 1,
wherein cloud controllers are configured to handle client and cloud controller requests asynchronously, thereby improving file access performance for the distributed filesystem; and
wherein the first cloud controller does not block on remote operations and continues to process new incoming client requests, send interim notifications to clients, and initiate additional remote operations while waiting for a given remote request to complete.

6. A non-transitory computer-readable storage medium storing instructions that when executed by a computer cause the computer to perform a method for sending interim notifications to a client of a distributed filesystem, the method comprising:
collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems;
receiving at a first cloud controller a request from the client to access a file, wherein the client is configured to abort the request if the duration of the request exceeds a timeout interval;
determining from at least one of a level of consistency associated with the file and the type of file access being requested by the client for the file that the first cloud controller needs to initiate a remote request to contact at least one of a second, distinct cloud controller or a cloud storage system to service the request, wherein the first cloud controller determines that the request comprises a write operation that accesses the most recently updated version of the file, wherein the second cloud controller is the owning cloud controller for the file, wherein the remote request comprises contacting the second cloud controller to synchronize recent updates for the file to the first cloud controller and to claim ownership for the file to facilitate client write access for the file; and
sending an interim notification from the first cloud controller to the client before the timeout interval expires to notify the client that the request is pending and to ensure that the client does not abort the request, wherein sending the interim notification comprises tracking a set of delays associated with accessing the second cloud controller, determining from the tracked information that the remote request is likely to exceed the client timeout interval, and ensuring that the client receives the interim notification before the timeout interval is exceeded.

7. The non-transitory computer-readable storage medium of claim 6, wherein sending the interim notification to the client further comprises:
calculating an initial interval that gives the remote request as much additional time as possible while also ensuring that the timeout interval is not exceeded; and
delaying sending the interim notification from the first cloud controller to the client until the initial interval has expired.

8. The non-transitory computer-readable storage medium of claim 6, wherein sending the interim notification to the client further comprises:
determining that the remote request may involve substantial delay that exceeds multiple client timeout intervals; and
sending multiple interim notifications to the client to indicate to the client that the request is still pending but needs additional time.

9. The non-transitory computer-readable storage medium of claim 6,
wherein the client is configured to send asynchronous file access requests to the first cloud controller; and
wherein, upon receiving the interim notification, the client proceeds to initiate other file operations and file requests to the first cloud controller instead of busy-waiting for the request, thereby improving file access performance for the client.

10. A cloud controller that sends interim notifications to a client of a distributed filesystem, comprising:
a processor; and
a local storage device that stores a copy of the metadata for the distributed filesystem;
wherein two or more cloud controllers collectively manage the data of the distributed filesystem;
wherein the cloud controller:
receives a request from the client to access a file, wherein the client is configured to abort the request if the duration of the request exceeds a timeout interval;
determines from at least one of a level of consistency associated with the file and the type of file access being requested by the client for the file that the cloud controller needs to initiate a remote request to contact at least one of a second, distinct cloud controller or a cloud storage system to service the request, wherein the cloud controller determines that the request comprises a write operation that accesses the most recently updated version of the file, wherein the second cloud controller is the owning cloud controller for the file, wherein the remote request comprises contacting the second cloud controller to synchronize recent updates for the file to the cloud controller and to claim ownership for the file to facilitate client write access for the file; and sends an interim notification to the client before the timeout interval expires to notify the client that the request is pending and to ensure that the client does not abort the request, wherein sending the interim notification comprises tracking a set of delays associated with accessing the second cloud controller, determining from the tracked information that the remote request is likely to exceed the client timeout interval, and ensuring that the client receives the interim notification before the timeout interval is exceeded.

* * * * *